(12) United States Patent
Wouters et al.

(10) Patent No.: US 7,915,354 B2
(45) Date of Patent: Mar. 29, 2011

(54) MULTIMODAL ETHYLENE-ALPHA-OLEFIN ELASTOMERS AND PROCESS FOR MAKING

(75) Inventors: Guy Joseph Wouters, Brussels (BE); Periagaram Srinivasan Ravishankar, Kingwood, TX (US); Giandomenico Stella, Brussels (BE); Maria Dolores Ellul, Silver Lake Village, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 707 days.

(21) Appl. No.: 11/825,966

(22) Filed: Jul. 10, 2007

(65) Prior Publication Data

US 2008/0033107 A1 Feb. 7, 2008

Related U.S. Application Data

(60) Provisional application No. 60/834,694, filed on Aug. 1, 2006.

(51) Int. Cl.
*C08F 2/00* (2006.01)
*C08F 4/06* (2006.01)
*C08F 4/64* (2006.01)
*C08F 12/34* (2006.01)
*C08F 236/00* (2006.01)

(52) U.S. Cl. ........ 526/65; 526/66; 526/143; 526/169; 526/336; 526/348

(58) Field of Classification Search ............ 526/65, 526/66, 143, 169, 336, 348
See application file for complete search history.

(56) References Cited

U.S. PATENT DOCUMENTS

| 3,884,993 A | 5/1975 | Gros ................. 260/897 A |
| 4,078,131 A | 3/1978 | de Zarauz ............... 526/20 |
| 5,571,883 A | 11/1996 | Jourdain et al. |
| 5,677,382 A | 10/1997 | Tsuji et al. ............... 525/237 |
| 6,329,477 B1 | 12/2001 | Harrington et al. |
| 6,686,419 B2 | 2/2004 | Wouters et al. |
| 2002/0032284 A1* | 3/2002 | Jourdain et al. ............ 525/285 |
| 2003/0065102 A1* | 4/2003 | Jourdain et al. ........... 525/327.4 |
| 2004/0214958 A1* | 10/2004 | Jourdain et al. ........... 525/327.4 |

FOREIGN PATENT DOCUMENTS

| EP | 0 227 206 | 7/1987 |
| EP | 0 446 380 | 9/1991 |
| EP | 0 446 382 | 9/1991 |
| EP | 0 704 484 | 4/1996 |
| JP | 53 022551 | 3/1978 |
| WO | WO 00/26296 | 5/2000 |
| WO | WO 03/066725 | 8/2003 |

OTHER PUBLICATIONS

E. K. Easterbrook et al., "Ethylene-Propylene Rubber," Rubber Technology 3rd Edition (M. Morton, ed., Chapman & Hall, 1995), pp. 260-266.

R. Chandra et al., "Studies on Dynamic Behaviour and Flow Properties of HDPE/EPDM Blends by Torque Rheometer," Polymer International 37 (1995), pp. 141-147.

* cited by examiner

Primary Examiner — William K Cheung

(57) ABSTRACT

Disclosed herein is a multimodal polymer composition comprising 45 to 75 wt % of a first polymer fraction, 25 to 55 wt % of a second polymer fraction, and from 10-50 phr of an extender oil. The multimodal polymer composition has an overall Mooney viscosity of less than 90 ML(1+4@125° C.), and each polymer fraction comprises an ethylene, $C_3$-$C_{10}$ alpha-olefin, non-conjugated diene polymer, wherein the first polymer fraction has a Mooney viscosity of greater than or equal to about 150 ML(1+4@125° C.), the second polymer fraction has a Mooney viscosity from about 20 to about 120 ML(1+4@125° C.). A process for making the multimodal polymer composition comprising a process utilizing two or more reactors in series is also disclosed.

11 Claims, No Drawings

MULTIMODAL ETHYLENE-ALPHA-OLEFIN ELASTOMERS AND PROCESS FOR MAKING

CROSS REFERENCE TO RELATED APPLICATION

This application claims the benefit of Provisional Application No. 60/834,694 filed Aug. 1, 2006, the disclosure of which is incorporated by reference in its entirety.

BACKGROUND OF THE INVENTION

Vibration damping devices are used to absorb vibrational energy in machines of nearly every description and use. Unless a damping device is used, vibrational energy is directly transmitted to support and surrounding structures of the machine, which can be disadvantageous. To be useful, a damping device is required to maintain high resiliency and other performance characteristics under a wide range of temperature and other environmental conditions, for a relatively long period of time.

Examples of vibration damping devices include formed shapes, mountings, harnesses, rings, bushings, and belts used to isolate sources of vibration. Natural rubber is often used in vibrational damping applications because it provides high resiliency and tear resistance. However, natural rubber does not last long under conditions of extreme heat (i.e., >120° C.) or under ozone concentrations as found in many automotive applications.

Ethylene-based elastomers such as ethylene-propylene (alpha-olefin)-diene (EPDM) elastomers are generally polymers of very high molecular weight (as measured by their Mooney viscosities) and are often suitable for use in high resilience applications. However, high molecular weight EPDM elastomers inherently possess very high viscosities, e.g., Mooney viscosity greater than 200 ML(1+4@125° C.). This inherent characteristic of EPDM results in difficulties related to the processability of these polymers. Such polymers are not processable when having Mooney viscosities above about 100 ML(1+4@125° C.). To remedy the concerns associated with the high viscosity of high molecular weight EPDM, extender oil is often added to the polymers to the reactor effluent containing the polymers to reduce the apparent viscosity. The presence of extender oil may, however, render oil extended EPDM difficult to mix and compound in some applications.

The required level of extender oil depends on the molecular weight of the elastomer, but is usually sufficient to reduce the apparent viscosity of the oil extended EPDM to a Mooney viscosity of about 100 ML(1+4@125° C.) or below. Commercially-available very high molecular weight EPDMs, which would be useful in high resilience applications such as vibrational damping, typically contain from about 50 to about 125 phr extender oil.

While extender oils improve processability during manufacturing, elastomers extended with oil are limited in compounding latitude. The amount or the type of extender oil may be undesirable in the compound recipe, and thus may restrict further compounding options for the material. Additionally, extender oils consume valuable plant throughput capacity. Thus, polymer architectures that minimize the presence of extender oil are beneficial.

Examples of EPDM polymers and processes for making them include U.S. Pat. No. 3,884,993, which is directed to a method for improving the processability and ozone resistance of EPDM elastomers, the method comprising the steps of blending solutions of separately formed low and high molecular weight polymers, where the high MW fraction has a Modified Mooney viscosity, MML (1+8 @ 150° C.) of greater than 100, and the low MW fraction has a number average molecular weight Mn below 25,000, which corresponds to a Mooney viscosity of less than about 20 ML(1+4@125° C.). The ratio of the low to the high MW fraction is 0.7 to 1.3. The compositions are produced by a process using parallel reactors.

U.S. Pat. No. 4,078,131 is directed to EPDM compositions consisting of a low molecular weight fraction having an intrinsic viscosity from 0.8 to 1.5 dl/g, and a high molecular weight fraction having an intrinsic viscosity of 3.5 to 7 dl/g, which are prepared by 2 reactors connected in series. The fractions each have a broad molecular weight distribution. The low MW fraction represents from 30 to 85% of the total polymer composition. These compositions are reported to be useful to provide a balance between green strength and tack in tire building. The intrinsic viscosity of the low molecular weight fraction would correspond to a Mooney viscosity of less than about 25 ML(1+4@125° C.) for a polymer of broad molecular weight distribution.

U.S. Pat. No. 5,677,382 is directed to ethylene-alpha-olefin-non-conjugated diene copolymer compositions reported to have improved processability. The polymers comprise a low molecular weight component and a high molecular weight component. The low molecular weight component has a Mooney viscosity of 10-150 ML(1+4@100° C.), and the high molecular weight component has a Mooney viscosity of 100-500 ML(1+4@100° C.). The ratio of the low molecular weight component to the high molecular weight component is 51/49 to 95/5. The low molecular weight component has an alpha-olefin content of 30-60 wt %, and the iodine number ratio of the low molecular weight component to the high molecular weight component is at least 4/1.

Solvent is generally removed from metallocene-based processes utilizing flash evaporation of the solvent under vacuum, wherein reduced pressure is applied to the reaction product. However, at least a portion of the oil present in the reaction product may become entrained in the solvent being removed under reduced pressure, and may be removed along with the solvent. Metallocene-based processes thus do not allow for the introduction of extender oil into the final reaction product until after the solvent has been removed by flash evaporation.

Metallocene-based processes may be limited to a polymer product having an overall Mooney viscosity of less than about 90 ML (1+4@120° C.) in the absence of extender oil, due to the handling characteristics of such polymers including the difficulties of further processing polymers having a Mooney viscosity above about 90 ML (1+4@120° C.). However, polymer compositions having a Mooney viscosity of less than or equal to about 90 ML (1+4@120° C.) in the absence of extender oil have inferior properties, in particular flex fatigue of a cured compound.

WO 00/26296 is directed to ethylene-alpha-olefin elastomeric composition made by a series reactor operation in which the high molecular weight component has a Mooney viscosity less than or equal to 120, and is present in an amount no greater than 50 wt. %.

WO 2003 066725A2 is directed to bimodal EPDM polymer compositions, comprising a major polymer fraction having a Mooney viscosity above 120 ML(1+4@125° C.), and a minor polymer fraction having a Mooney viscosity of 120 ML(1+4@125° C.) or less, where the composition has a tan delta of 0.5 or less (125° C./10.4 rad/s). These compositions are essentially free of extender oil and preferably have a Mooney viscosity below 100 ML(1+4@125° C.) to ensure ease of processability. These compositions are especially useful for resilient applications such as vibration damping devices. The compositions are prepared using a series reactor process wherein the high molecular weight component is produced in the first reactor, and the low molecular weight component is produced in the second reactor, both using metallocene catalysts. Both components have relatively narrow molecular weight distributions with a polydispersity index (Mw/Mn) of less than 4, preferably less than 3. In addition, both components have a relatively high average branching index factor of greater than 0.7, preferably greater than 0.8, on a scale in which a branching index of 1 represents a linear polymer. However, upon curing, the compositions appear to be deficient in flex fatigue resistance, which is a measure of the ability of the material to perform in dynamic applications.

Accordingly, there exists a need in the art for copolymer compositions, in particular, ethylene-alpha-olefin elastomer compositions, which comprise improved elasticity, processability and flex resistance. Embodiments of the multimodal polymer composition produced according to the instant disclosure include economically produced synthetic materials that can have one or more of the following advantages over previously known materials: improved balance of processability, resilience, durability, and reduced quantities of extender oil.

SUMMARY OF THE INVENTION

In a first embodiment, a multimodal polymer composition relates to a multimodal polymer blend and an oil, wherein the multimodal polymer blend comprises:
  a) 45 to 75 wt % of a first polymer fraction comprising ethylene, a $C_3$-$C_{10}$ alpha-olefin, and a non-conjugated diene, wherein the first polymer fraction has been polymerized in a first reactor of a series of two or more reactors, using a Ziegler-Natta catalyst system, wherein the first polymer fraction has a Mooney viscosity of greater than or equal to about 150 ML(1+4@125° C.);
  b) 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction, in a second reactor of the series of two or more reactors, using a Ziegler-Natta catalyst system, wherein the second polymer fraction has a Mooney viscosity of greater than or equal to 20 ML(1+4@125° C.), and less than or equal to 120 ML(1+4@125° C.); and
  c) from about 10 to about 50 phr of an extender oil;
  wherein the multimodal polymer composition has a number average molecular weight from about 60,000 to about 350,000 g/mol, and a Mooney viscosity of less than about 90 ML(1+4@125° C.)

In another embodiment, a process to produce a multimodal polymer composition comprises the steps of:
  a) passing a first set of monomers comprising ethylene, a $C_3$-$C_{10}$ alpha-olefin, and non-conjugated diene, and a first Ziegler-Natta catalyst system into a first reactor of a series of two or more reactors;
  b) polymerizing the first set of monomers to produce a first reactor effluent comprising a first polymer fraction having a Mooney viscosity of greater than or equal to 150 ML(1+4@125° C.);
  c) directing the first reactor effluent into a second reactor of the series of two or more reactors;
  d) passing a second set of monomers comprising ethylene, a $C_3$-$C_{10}$ alpha-olefin, and non-conjugated diene, and a second Ziegler-Natta catalyst system into the second reactor;
  e) polymerizing the second set of monomers in the presence of the first polymer fraction to produce a second reactor effluent comprising at least a portion of the first polymer fraction and a second polymer fraction having a Mooney viscosity of from about 20 to about 120 ML(1+4@125° C.); and
  f) combining from about 10 phr to about 50 phr extender oil with the second reactor effluent to produce the multimodal polymer composition, wherein the multimodal polymer composition comprises:
    i) 45 to 75 wt % of the first polymer fraction; and
    ii) 25 to 55 wt % of the second polymer fraction;
  and wherein the multimodal polymer composition has a number average molecular weight of from about 60,000 to about 350,000 g/mol, and a Mooney viscosity of less than or equal to about 90 ML(1+4@125° C.)

DETAILED DESCRIPTION

Various specific embodiments, versions and examples of the present disclosure will now be described, including preferred embodiments and definitions that are adopted herein for purposes of understanding the claimed invention.

The term "cured composition" (e.g., cured multimodal polymer composition) refers to a composition that has been contacted with a curing agent and subjected to conditions (e.g., temperature, time, irradiation) required to crosslink at least a portion of the composition. The term cured composition is used interchangeably with the term vulcanized composition.

As used herein, the term "reactor", is defined to include any container(s) in which a chemical reaction occurs. For purposes herein, the numbering scheme for the Periodic Table Groups used are consistent with the numbering used in CHEMICAL AND ENGINEERING NEWS, 63(5), 27 (1985). The term polymer may refer to a homopolymer, a copolymer, an interpolymer, a terpolymer, and/or the like. Likewise, a copolymer may refer to a polymer comprising at least two monomers.

When a polymer is referred to as comprising a monomer, the monomer is present in the polymer in the polymerized form of the monomer, or in a derivative form of the monomer. When catalyst components are described as comprising neutral stable forms of the components, it is well understood by one skilled in the art that in some cases, the ionic form of the component is the form that reacts with the monomers to produce polymers.

The term "alkyl" refers to paraffinic hydrocarbon groups having from 1 to 20 carbon atoms, which may be derived from the corresponding alkane by removing one or more hydrogens from the formula. Examples include a methyl group ($CH_3$), which is derived from methane ($CH_4$), and an ethyl group ($CH_3CH_2$), which is derived from ethane ($CH_3CH_3$).

The term "aryl" refers to a hydrocarbon group comprising 5 to 20 carbon atoms that form a conjugated ring structure characteristic of aromatic compounds. Examples of aryl groups or substituents include benzene, naphthalene, phenanthrene, anthracene, and the like, which possess alternating double bonding ("unsaturation") within a cyclic structure. An aryl group is derived from an aromatic compound by dropping one or more hydrogens from the formula.

The term "substituted alkyl group(s)" refers to replacement of at least one hydrogen atom on an alkyl, alkene, alkyne, or aryl group having 1 to 20 carbon atoms, by at least one substituent. Examples of substituents include halogen (chlorine, bromine, fluorine, or iodine), amino, nitro, sulfoxy (sulfonate or alkyl sulfonate), thiol, alkylthiol, hydroxy, alkoxy, and straight, branched, or cyclic alkyls, alkenes, or alkynes having 1 to 20 carbon atoms. Examples of alkyl substituents include methyl, ethyl, propyl, tert-butyl, isopropyl, isobutyl, and the like. Examples of alkoxy substituents include methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy. The term haloalkyl refers to straight or branched chain alkyl groups having 1 to 20 carbon atoms in which at least one hydrogen atom is substituted by at least one halogen.

The term "hydrocarbyl" refers to any combination of alkyl, aryl, substituted alkyl, or the like.

The term tan ($\delta$) denotes the ratio of the loss modulus G", to the elastic modulus G' of a polymer. This ratio quantifies the ability of a material to dissipate mechanical energy into heat versus the purely elastic storage of mechanical motion during one cycle of an oscillatory movement. Tan ($\delta$) as used herein is determined by measuring tan ($\delta$) at constant frequency and strain over a temperature range. As used herein, tan ($\delta$) is measured at 125° C., at 10.4 rad/sec and 13.95% strain using Rubber Processing Analyzer RPA 2000 (Alpha Technologies Co).

As used herein, Mooney viscosity is measured as ML(1+4 @ 125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 ML points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4@125° C.) value equivalent. The MST rotor used herein was prepared and utilized according to the following specifications:

1. The rotor should have a diameter of 30.48±0.03 mm and a thickness of 2.8±0.03 mm (determined from the tops of serrations) and a shaft of 11 mm or less in diameter.
2. The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.
3. The rotor shall be positioned in the center of the die cavity such that the centerline of the rotor disk coincides with the centerline of the die cavity to within a tolerance of ±0.25 mm. A spacer or a shim may be used to raise the shaft to the midpoint, consistent with practices typical in the art for Mooney determination.
4. The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in Equation 1:

$$\log ML_{TOTAL} = n_A \log ML_A + n_B \log ML_B \qquad \text{(Equation 1)}$$

wherein all logarithms are to the base 10;

$ML_{TOTAL}$ is the Mooney viscosity of a blend of two polymers A and B each having individual Mooney viscosities $ML_A$ and $ML_B$, respectively;

$n_A$ represents the weight percent (wt %) fraction of polymer A in the blend; and $n_B$ represents the weight percent fraction of the polymer B in the blend.

In the instant disclosure, Equation (1) has been used to determine the Mooney viscosity of polymer B. Knowing ML, $ML_A$, $n_A$ and $n_B$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation:

$$ML_A(1+4@125° C.) = 5.13 * MST_A(5+4@200° C.),$$

wherein $MST_A$ represents the Mooney viscosity of component A determined using the above described MST rotor.

The relative degree of branching in the instant polymers is determined using an average branching index factor (BI). This factor is calculated using a series of four laboratory measurements of polymer properties in solution, as disclosed in VerStrate, Gary, "Ethylene-Propylene Elastomers", Encyclopedia of Polymer Science and Engineering, 6, 2nd edition (1986), which is incorporated by reference herein. The four measurements are:

(i) weight average molecular weight ($M_w$) measured using a low angle laser light scattering detector (LALLS) in combination with Gel Permeation Chromatography (GPC), abbreviated herein as "$M_{w\ GPC\ LALLS}$";

(ii) weight average molecular weight ($M_w$) determined using a differential refractive index (DRI) detector in combination with GPC, and abbreviated herein as "$M_{w\ GPC\ DRI}$";

(iii) viscosity average molecular weight ($M_v$) determined using a differential refractive index (DRI) detector in combination with GPC, and abbreviated herein as "$M_{v\ GPC\ DRI}$"; and (iv) intrinsic viscosity (also referred to in the art as inherent viscosity, and abbreviated IV) measured in decalin at 135° C.

The first three measurements (i, ii, and iii) are obtained via GPC using a filtered dilute solution of the polymer in trichlorobenzene.

The average branching index factor (BI) as disclosed herein is defined by Equation (2) as:

$$BI = \frac{M_{v,br} \times M_{w,GPC\ DRI}}{M_{w,GPC\ LALLS} \times M_{v,GPC\ DRI}} \quad (2)$$

where, $M_{v,br} = (IV/k)^{1/a}$; wherein "k" is a measured constant from a linear polymer as described by Paul J. Flory at page 310 of PRINCIPLES OF POLYMER CHEMISTRY (1953), and the summation is over all the slices in the distribution, and wherein "a" is the Mark-Houwink constant (=0.759 for ethylene, propylene diene elastomeric polymers in decalin at 135° C.).

From equation (2) it follows that the average branching index factor for a linear polymer is 1.0. For branched polymers, the extent of branching is defined relative to a linear polymer. Since at a constant number average molecular weight $M_n$, $(M_w)_{branch} > (M_w)_{linear}$, BI for branched polymers is less than 1.0, and a smaller BI value denotes a higher level of branching. In instances wherein measuring IV in decalin is impossible, IV may be measured for comparison to the instant disclosure using a viscosity detector in tandem with DRI and LALLS detectors in a so-called GPC-3D instrument. In this case, "k" and "a" values are selected which are appropriate for the GPC solvent used in making the determination.

As used herein, molecular weight distribution (MWD), also referred to as polydispersity, represents the weight average molecular weight divided by the number average molecular weight (Mw/Mn) of the polymer. In the instant disclosure, Mw and Mn are determined using Gel Permeation Chromatography on a Waters 150 gel permeation chromatograph equipped with a differential refractive index (DRI) detector and a Chromatix KMX-6 using an on-line light scattering photometer. The determination is made at 135° C. using 1,2,4-trichlorobenzene as the mobile phase and one of a Shodex (Showa Denko America, Inc) polystyrene gel column numbered 802, 803, 804 or 805. This technique is discussed in detail in "Liquid Chromatography of Polymers and Related Materials III", J. Cazes editor, Marcel Dekker, 1981, p. 207, which is incorporated herein by reference. In the data disclosed herein, corrections for column spreading are not employed.

Mw/Mn is preferably calculated from elution times. These numerical analyses are performed using commercially available Beckman/CIS customized LALLS software in conjunction with the standard Gel Permeation package. Calculations involved in the characterization of polymers by $^{13}C$ NMR follow the work of F. A. Bovey in "Polymer Conformation and Configuration" Academic Press, New York, 1969. Reference to Mw/Mn implies that the Mw is the value reported using the LALLS detector and Mn is the value reported using the DRI detector described above.

The multimodal polymer compositions disclosed herein are multimodal, meaning the polymers comprise a combination of at least two fractions, referred to as a first polymer fraction and as a second polymer fraction. However, it is noted that the numbering of the fractions are for evidentiary purposes only and in the absence of any direct indication otherwise, the numbering of the fractions does not, and is not intended to, refer to any order in which the fractions are produced, blended, or otherwise included into the multimodal polymer compositions disclosed herein.

The multimodality of the multimodal polymer compositions may manifest itself as two distinct peaks, or as a main peak and a shoulder peak in the $M_w$ GPC LALLS signal. In an embodiment, the multimodality may be caused by the blending of a high molecular weight fraction with a low molecular weight fraction component, which results from sequential polymerization. In another embodiment, physical blending techniques well known in the art may be employed to produce the multimodal polymer compositions described herein.

Suitable ranges of various properties and parameters as discussed herein include combinations of any lower and any upper limit disclosed for that property/parameter.

Multimodal Polymer Composition

The multimodal polymer compositions of this disclosure comprise multimodal polymers comprising units derived from ethylene, one or more alpha-olefin(s) and one or more diene(s). These polymers are referred to herein as EPDM-type polymers, as EPDM terpolymers, or as EPDM polymers, interchangeably.

The alpha-olefin of the EPDM polymer is preferably one or more of a $C_3$ to $C_8$ alpha-olefin, more preferably propylene or butene, most preferably propylene. The diene of the EPDM polymer is preferably a non-conjugated diene. More preferably, the diene is a non-conjugated diene selected from the group consisting of 5-ethylidene-2-norbornene (ENB), 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), divinylbenzene (DVB), and combinations thereof. The most preferred diene for use herein is ENB.

In a preferred embodiment, the multimodal polymer composition comprises an EPDM polymer comprising a bimodal composition. The bimodal composition comprises a high molecular weight first polymer fraction, and a low molecular weight second polymer fraction. In an embodiment, the multimodal polymer composition disclosed herein also comprises an extender oil, as described in detail herein.

The multimodal polymer composition preferably comprises between about 45 wt % and about 75 wt % of the first polymer fraction, based on the total weight of the first polymer fraction and the second polymer fraction (or fractions) present in the composition. Within this range, the multimodal polymer composition preferably comprises about 45-55 wt % of the first polymer fraction, with the remainder of the polymer in the composition comprising the second polymer fraction.

In a preferred embodiment, the weight percent (based on the total polymer weight) of ethylene in the first polymer fraction and the weight percent of ethylene in the second polymer fraction differ by no more than about 20 wt %, even more preferably by no more than about 10 wt %. Also, in a preferred embodiment, the weight percent diene in each fraction differs by no more than about 8 wt %, preferably by no more than about 3 wt %, more preferably by no more than about 2 wt %, and most preferably by no more than about 1 wt % diene.

High Molecular Weight First Polymer Fraction

In an embodiment, the multimodal polymer composition comprises a first polymer fraction having a Mooney viscosity of greater than or equal to about 150 ML(1+4 @125° C.) (determined using the MST (5+4 @200° C.) and converted to the ML(1+4 @125° C.) value equivalent.) Preferably, the first polymer fraction has a Mooney viscosity of at least 200, and even more preferably at least 250 ML(1+4 @125° C.).

The first polymer fraction may have a Mn between about 60,000 and 500,000 g/mol. Within this range, the first polymer fraction preferably has a Mn of at least 80,000, with at least 100,000 g/mol being preferred. The first polymer fraction also preferably has a Mn of less than 450,000, with less than 400,000 g/mol being more preferred.

The first polymer fraction has a MWD between about 2 and 10. Within this range, the first polymer fraction preferably has a MWD of at least 2.5, with at least 3 being preferred. The first polymer fraction also preferably has a MWD of less than 9, with less than 8 being more preferred.

The first polymer fraction preferably has a BI between about 0.3 and 1. The first polymer fraction also preferably has a BI of less than 0.95, with less than 0.9 being preferred, and less than 0.6 being more preferred.

The first polymer fraction preferably comprises about 35 to about 90 mol % ethylene, based on the total number of moles of the first polymer fraction, determined by measuring the effluent of the first reactor and of the second reactor, while assuming a linear blending. The ethylene and diene content are determined utilizing FTIR, as known to one of skill in the art, and the propylene content is determined by difference. Within this range, the first polymer fraction preferably comprises at least 45 mol %, with at least 55 mol % ethylene being preferred. The first polymer fraction also preferably comprises less than 80 mol % ethylene, with less than 75 mol % ethylene being more preferred.

The first polymer fraction preferably comprises about 10 to about 65 mol % alpha-olefin, based on the total number of moles of the first polymer fraction. Within this range, the first polymer fraction preferably comprises at least 15 mol %, with at least 25 mol % alpha-olefin being preferred. The first polymer fraction also preferably comprises less than 45 mol % alpha-olefin.

In an embodiment, the alpha-olefin is preferably propylene. In an embodiment, the first polymer fraction preferably comprises about 15 to about 70 mol % propylene, based on the total number of moles of the first polymer fraction. Within this range, the first polymer fraction preferably comprises at least 20 mol %, with at least 30 mol % being preferred. The first polymer fraction also preferably comprises less than 50 mol % propylene.

The first polymer fraction preferably comprises about 0.1 to about 10 wt % (about 0.03 to about 3 mol %) diene, based on the total weight of the first polymer fraction. Within this range, the first polymer fraction preferably comprises at least 2.5 wt % (about 0.7 mol %), with at least 3 wt % (about 0.85 mol %) being preferred, and at least 4 wt % (about 1.15 mol %) diene being more preferred. The first polymer fraction also preferably comprises less than 8 wt % (about 2.3 mol %) diene, with less than 7 wt % (about 2 mol %) diene being more preferred.

Low Molecular Weight Second Polymer Fraction

The multimodal polymer composition also comprises at least one second polymer fraction. However, since the second polymer fraction is combined with the polymer fraction prior to the measurement of properties, the second polymer fraction properties can only be inferred from first polymer fraction properties and combined blend properties. The second polymer fraction has a Mooney viscosity of less than or equal to about 120 ML(1+4@125° C.), preferably less than 100, more preferably less than 90, and even more preferably less than 70. The second polymer fraction also preferably has a Mooney viscosity of at least 20 ML(1+4@125° C.), preferably at least 40, at least 50 being more preferred, with at least 60 being still more preferred.

The second polymer fraction preferably has a Mn between about 20,000 and 100,000 g/mol. Within this range, the second polymer fraction preferably has a Mn of at least 30,000 with at least 40,000 g/mol being preferred. The second polymer fraction also preferably has a Mn of less than 90,000 g/mol. The Mn of the second polymer fraction is calculated from the calculated Mooney viscosity of the second fraction, assuming an Mw/Mn of 2 for that second fraction.

The second polymer fraction preferably comprises about 30 to about 90 mol % ethylene, based on the total number of moles of the second polymer fraction. Within this range, the second polymer fraction preferably comprises at least 45 mol %, with at least 55 mol % being preferred. The second polymer fraction also preferably comprises less than 80 mol % ethylene, with less than 75 mol % ethylene being more preferred.

The second polymer fraction preferably comprises about 10 to about 65 mol % alpha-olefin, based on the total number of moles of the second polymer fraction. Within this range, the second polymer fraction preferably comprises at least 15 mol %, with at least 25 mol % alpha-olefin being preferred. The second polymer fraction also preferably comprises less than 45 mol % alpha-olefin.

In an embodiment, the alpha-olefin is preferably propylene. In an embodiment, the second polymer fraction preferably comprises about 15 to about 70 mol % propylene, based on the total number of moles of the second polymer fraction. Within this range, the second polymer fraction preferably comprises at least 20 mol %, with at least 30 mol % being preferred. The second polymer fraction also preferably comprises less than 50 mol % propylene.

The second polymer fraction preferably comprises about 0.1 to about 10 wt % (about 0.03 to about 3 mol %) diene, based on the total weight of the second polymer fraction. Within this range, the second polymer fraction preferably comprises at least 2.5 wt % (about 0.7 mol %), with at least 3 wt % (about 0.85 mol %) being preferred, and at least 4 wt % (about 1.15 mol %) diene being more preferred. The second polymer fraction also preferably comprises less than 8 wt % (about 2.3 mol %) diene, with less than 7 wt % (about 2 mol %) diene being more preferred.

Multimodal Polymer Composition Extender Oil and Additives

The instant multimodal polymer composition comprises an extender oil, and may further comprise one or more additives including, but not limited to, carbon black, plasticizers, processing aids such as fatty acids, waxes, and the like, antioxidants, curatives, fillers including calcium carbonate, clay, silica and the like, antiozonants, tackifiers, scorch inhibiting agents, and other additives known in the art.

Extender Oils

The terms "extender oil" and simple "oil" are used interchangeably herein, and refer to a compound comprising carbon and hydrogen, which is a liquid at 25° C. Examples of extender oils include various types of paraffins and paraffin blends, dearomaticized aliphatic hydrocarbons, high-purity hydrocarbon fluids, polyalphaolefins, polybutenes, and mineral oils.

Paraffins

In an embodiment, the extender oil may comprise, or may consist essentially of one or more paraffins. For purposes of the present invention and the description herein, the term "paraffin" includes all isomers such as normal or linear paraffins (n-paraffins), branched paraffins, also referred to as isoparaffins, and cyclic paraffins, preferably cyclic aliphatic paraffins. Paraffins may be derived synthetically by means known in the art, or may be refined from crude oil in such a way as to meet the requirements of an extender oil as described herein. It is to be understood that the classes of materials described herein that are useful as extender oils can be utilized alone, or admixed with other extender oils, other plasticizers, and the like, in order to obtain the recited properties.

In an embodiment, an extender oil may comprise, or may consist essentially of one or more $C_6$ to $C_{200}$ paraffins. In a preferred embodiment, the extender oil may comprise $C_8$ to $C_{100}$ paraffins, more preferably $C_6$ to $C_{200}$ paraffins, more preferably $C_8$ to $C_{100}$ paraffins.

A preferred extender oil or blend thereof may comprise a paraffin having one or more of the following properties:

1. a distillation range as determined by ASTM D 86 having a difference between the upper temperature and the lower temperature of 40° C. or less, preferably 35° C. or less, preferably 30° C. or less, preferably 25° C. or less, preferably 20° C. or less, preferably 15° C. or less, preferably 10° C. or less, preferably 6 to 40° C., preferably 6 to 30° C.; and/or
2. an initial boiling point as determined by ASTM D 86 greater than 50° C., preferably greater than 100° C., preferably greater than 120° C., preferably greater than 130° C., preferably greater than 140° C., preferably greater than 150° C., preferably greater than 160° C., preferably greater than 170° C., preferably greater than 180° C., preferably greater than 190° C., preferably greater than 200° C., preferably greater than 210° C., preferably greater than 220° C., preferably greater than 230° C., preferably greater than 240° C.; and/or
3. a pour point of 10° C. or less (as determined by ASTM D 97), preferably 0° C. or less, preferably −5° C. or less, preferably −15° C. or less, preferably −40° C. or less, preferably −50° C. or less, preferably −60° C. or less; and/or
4. a specific gravity (ASTM D 4052, 15.6° C.) of less than 0.88, preferably less than 0.85, preferably less than 0.80, preferably less than 0.75, preferably less than 0.70, preferably 0.65 to 0.88, preferably 0.70 to 0.86, preferably 0.75 to 0.85, preferably 0.79 to 0.85, preferably 0.80 to 0.84; and/or
5. a final boiling point as determined by ASTM D 86 of less than 700° C., preferably 115° C. to 500° C., preferably 200° C. to 450° C., preferably 250° C. to 400° C.; and/or
6. a weight average molecular weight (Mw) less than 21,000 g/mol determined by GPC, preferably 100 to 2000, preferably 150 to 1500, more preferably 200 to 1000; and/or
7. a number average molecular weight (Mn) of 100 to 2000 g/mol determined by GPC, preferably 150 to 1500, more preferably 200 to 1000; and/or
8. a flash point as measured by ASTM D 56 of greater than −30° C., preferably −30° C. to 150° C., and/or
9. a dielectric constant at 20° C. of less than 3.0, preferably less than 2.8, preferably less than 2.5, preferably less than 2.3, preferably less than 2.1; and/or
10. a density (ASTM 4052, 15.6/15.6° C.) of less than 0.90 g/cm³, preferably 0.70 to 0.83; and/or
11. a viscosity (ASTM 445, 25° C.) of 0.5 to 20 cSt at 25° C.; and/or
12. a carbon number of 6 to 150, preferably 7 to 100, more preferably 10 to 30, more preferably 12 to 25; and/or
13. a kinematic viscosity ("KV") of 2 centi Stokes (cSt) or less at 100° C., preferably 1.5 cSt or less, preferably 1.0 cSt or less, preferably 0.5 cSt or less, as determined according to ASTM D 445; and/or
14. a glass transition temperature (Tg) according to ASTM E 1356 of less than 30° C. preferably less than 20° C., more preferably less than 10° C., more preferably less than 0° C., more preferably less than −5° C., more preferably less than −10° C., more preferably less than −15° C., still more preferably a Tg that cannot be determined according to ASTM E 1356.

n-Paraffins

Extender oils may comprise linear or normal paraffins (n-paraffins). Preferred n-paraffins comprise at least 50 weight %, preferably at least 60 wt %, preferably at least 70 wt %, preferably at least 80 wt %, preferably at least 90 wt %, preferably at least 95 wt % preferably essentially 100 wt % of $C_5$ to $C_{25}$ n-paraffins, more preferably $C_5$ to $C_{20}$ n-paraffins, more preferably $C_5$ to $C_{15}$ n-paraffins. Preferred n-paraffins may also comprise less than 0.1%, preferably less than 0.01% aromatics. In a preferred embodiment, the n-paraffins may have:

a KV of 2 cSt or less at 100° C.; and/or
a distillation range of 30° C. or less, preferably 20° C. or less; and/or
an initial boiling point greater than 150° C., preferably greater than 200° C.; and/or
a specific gravity of 0.65 to 0.85, more preferably 0.70 to 0.80, more preferably 0.75 to 0.80; and/or
a flash point greater than 60° C., more preferably greater than 90° C., more preferably greater than 100° C., still more preferably greater than 120° C. Examples of suitable n-paraffins are commercially available under the tradename NORPAR (ExxonMobil Chemical Company, Houston Tex.).

Isoparaffins

The extender oil may comprise a branched paraffin, also referred to as an isoparaffin. By isoparaffin it is meant that a paraffin chain possess $C_1$ to $C_{10}$ alkyl branching along at least a portion of the paraffin chain. More particularly, the isoparaffins are saturated aliphatic hydrocarbons whose molecules have at least one carbon atom bonded to at least three other carbon atoms or at least one side chain (i.e., a molecule having one or more tertiary or quaternary carbon atoms), and preferably wherein the total number of carbon atoms per molecule is in the range between 6 to 50, more preferably between 10 and 24, still more preferably from 10 to 15. Various isomers of each carbon number may be present. Suitable isoparaffins for use as extender oil's may also include cycloparaffins having branched side chains. Cycloparaffins may also exist as a minor component of a particular isoparaffin.

The extender oil may comprise at least 50 wt %, preferably at least 60 wt %, preferably at least 70 wt %, preferably at least 80 wt %, preferably at least 90 wt %, preferably at least 95 wt % preferably essentially 100 wt % of $C_6$ to $C_{150}$ isoparaffins. More preferably, the extender oil comprises $C_6$ to $C_{100}$ isoparaffins, more preferably $C_6$ to $C_{25}$ isoparaffins, more preferably $C_8$ to $C_{20}$ isoparaffins.

Preferred isoparaffins may include:
a density of 0.70 to 0.83 g/cm³; and/or
a pour point of −40° C. or less, preferably −50° C. or less; and/or
a viscosity (ASTM 445, 25° C.) of 0.5 to 20 cSt at 25° C.; and/or
a weight average molecular weight (Mw) of 100 to 300 g/mol determined by GPC.

The isoparaffins may include greater than 50 wt % (by total weight of the isoparaffin) mono-methyl species, for example, 2-methyl, 3-methyl, 4-methyl, 5-methyl or the like, with minimum formation of branches with substituent groups of carbon number greater than 1, (e.g., ethyl, propyl, butyl and the like), based on the total weight of isoparaffins in the extender oil. In one embodiment, the isoparaffin includes greater than 70 wt % mono-methyl species, based on the total weight of the isoparaffin present.

Preferably, the isoparaffin has a boiling point of from 100° C. to 350° C., more preferably 110° C. to 320° C. In preparing different grades of isoparaffin, a paraffinic mixture may be fractionated into cuts having narrow boiling ranges, for example, of about 35° C.

Suitable isoparaffins are commercially available under the tradename ISOPAR (ExxonMobilu Chemical Company, Houston Tex.), and are described in, for example, U.S. Pat. No. 6,197,285 (column 5, lines 1-18), U.S. Pat. Nos. 3,818, 105 and 3,439,088. Other suitable isoparaffins for use as extender oils are commercially available under the trade names SHELLSOL (by Shell Chemical Co.), SOLTROL (by Chevron Phillips) and SASOL (by Sasol Limited). SHELLSOL is a product of the Royal Dutch/Shell Group of Companies, for example Shellsol™ (boiling point=215-260° C.). SOLTROL is a product of Chevron Phillips Chemical Co. LP, for example SOLTROL 220 (boiling point=233-280° C.). SASOL is a product of Sasol Limited (Johannesburg, South Africa), for example SASOL LPA-210, SASOL-47 (boiling point=238-274° C.).

Paraffin Blends

In another embodiment, the extender oil may comprise paraffin blends comprising a mixture or blend of two or more cyclic, branched, or normal paraffins. Preferred blends have a KV of 2 cSt or less at 100° C. Paraffins in the blends preferably comprise from 6 to 50 carbon atoms, more preferably 10 to 24 carbon atoms. The paraffin blends may have a branch paraffin to n-paraffin molar ratio (moles branched paraffin: moles n-paraffin) of 0.5:1 to 9:1, preferably 1:1 to 4:1, based on the total moles of paraffin present in the blend.

The paraffin blend may include isoparaffins having greater than 50 wt % (by total weight of the blend) mono-methyl species, for example, 2-methyl, 3-methyl, 4-methyl, 5-methyl or the like, with minimum formation (i.e., less than 10 wt %) of branches with substituent groups of carbon number greater than 1, (e.g., ethyl, propyl, butyl and the like), based on the total weight of isoparaffins in the extender oil. In one embodiment, the isoparaffins of the composition contain greater than 70 wt % of the mono-methyl species, based on the total weight of the isoparaffins present in the mixture or blend. Preferably, the paraffin blend has a boiling point of 100° C. to 350° C., more preferably 110° C. to 320° C.

Dearomaticized Aliphatic Hydrocarbon

In an embodiment, the extender oil may comprise a dearomaticized aliphatic hydrocarbon, which may comprise normal paraffins, isoparaffins and/or cycloparaffins. Preferred dearomaticized aliphatic hydrocarbons have a KV of 2 cSt or less at 100° C., and preferably comprise at least 50 weight %, preferably at least 60 wt %, preferably at least 70 wt %, preferably at least 80 wt %, preferably at least 90 wt %, preferably at least 95 wt % preferably essentially 100 wt % of dearomaticized aliphatic hydrocarbon.

Preferred dearomaticized aliphatic hydrocarbons may include a mixture of $C_4$ to $C_{25}$ normal paraffins, isoparaffins and cycloparaffins, more preferably $C_5$ to $C_{18}$, still more preferably $C_5$ to $C_{12}$. Preferred dearomaticized aliphatic hydrocarbons may contain less than 0.1 wt %, preferably less than 0.01 wt % aromatics, based on the total weight of the dearomaticized aliphatic hydrocarbon.

In a preferred embodiment the dearomaticized aliphatic hydrocarbon may have:
- a distillation range of 30° C. or less, preferably 20° C. or less; and/or
- an initial boiling point greater than 50° C., preferably greater than 100° C., preferably greater than 200° C.; and/or
- a specific gravity (15.6° C.) of 0.65 to 0.85, more preferably 0.70 to 0.85, more preferably 0.75 to 0.85, still more preferably 0.80 to 0.85; and/or
- a flash point greater than 60° C., more preferably greater than 90° C., more preferably greater than 100° C., still more preferably greater than 110° C.

Suitable dearomaticized aliphatic hydrocarbons are commercially available under the tradename EXXSOL (ExxonMobil Chemical Company, Houston Tex.).

High Purity Hydrocarbon Fluids

The extender oil of the present invention may comprise a "high purity" hydrocarbon fluid, preferably comprising one or more paraffins having 6 to 1500 carbon atoms, preferably 8 to 1000 carbon atoms, preferably 10 to 500 carbon atoms, preferably 12 to about 200 carbon atoms, preferably 14 to 150 carbon atoms, preferably 16 to 100 carbon atoms. The high purity hydrocarbon fluid composition may have an isoparaffin:n-paraffin ratio of about 0.5:1 to about 9:1, preferably about 1:1 to about 4:1. The isoparaffins of the "high purity" hydrocarbon fluid composition may contain greater than fifty percent mono-methyl species, e.g., 2-methyl, 3-methyl, 4-methyl, ≧5-methyl or the like, with minimum formation of branches with substituent groups of carbon number greater than 1, i.e., ethyl, propyl, butyl or the like, based on the total weight of isoparaffins in the mixture. Preferably, the isoparaffins of the "high purity" hydrocarbon fluid composition contain greater than 70 percent of the mono-methyl species, based on the total weight of the composition.

A preferred high purity hydrocarbon fluid may have:
- a KV at 25° C. of 1 to 100,000 cSt, preferably 10 cSt to 2000 cSt; and/or
- a KV at 40° C. of 1 to 30,000 cSt, preferably 10 cSt to 2000 cSt; and/or
- a pour point below −20° C., more preferably below −30° C., more preferably from about −20° C. to about −70° C.

In a preferred embodiment, a high purity hydrocarbon fluid may comprise paraffins having:
- a number average molecular weight of 500 to 21,000 g/mol; and/or
- less than 10% side chains having 4 or more carbons, preferably less than 8 weight %, preferably less than 5 weight %, preferably less than 3 weight %, preferably less than 2 weight %, preferably less than 1 weight %, preferably less than 0.5 weight %, preferably less than 0.1 weight %, preferably at less than 0.1 weight %, preferably at 0.001 weight %; and/or
- at least 1 or 2 carbon branches present at 15 weight % or more, preferably 20 weight % or more, preferably 25 weight % or more, preferably 30 weight % or more, preferably 35 weight % or more, preferably 40 weight % or more, preferably 45 weight % or more, preferably 50 weight % or more; and/or
- less than 2.5 weight % cyclic paraffins, preferably less than 2 weight %, preferably less than 1 weight %, preferably less than 0.5 weight %, preferably less than 0.1 weight %, preferably at less than 0.1 weight %, preferably at 0.001 weight %.

In another preferred embodiment, a high purity hydrocarbon fluid may comprise paraffins having:
- a KV of 2 cSt or more at 100° C.; and/or
- a viscosity index of 120 or more, preferably 130 or more, preferably 140 or more, preferably 150 or more, preferably 170 or more, preferably 190 or more, preferably 200 or more, preferably 250 or more, preferably 300 or more; and/or
- a mixture of paraffins of carbon number ranging from about $C_8$ to $C_{20}$; and/or a molar ratio of isoparaffins to n-paraffins of about 0.5:1 to about 9:1; and/or greater than 50 percent of mono-methyl species, based on the total weight of the isoparaffins; and/or a pour point of about −20° F. to about −70° F.; and/or a kinematic viscosities at 25° C. of about 1 cSt to about 10 cSt; and/or a carbon number of $C_{10}$ to about $C_{16}$; and/or greater than 70 percent mono-methyl species; and/or a boiling temperature of about 320° F. to about 650° F., more preferably of about 350° F. to about 550° F.

In a preferred embodiment, the high purity hydrocarbon fluid comprises a mixture of paraffins having a carbon number of $C_{10}$ to about $C_{16}$;

contains greater than 70 percent mono-methyl species;

has a boiling temperature of about 350° F. to about 550° F., and has a molar ratio of isoparaffins to n-paraffins of about 1:1 to about 4:1.

The high purity hydrocarbon fluid may also be derived from a Fischer-Tropsch process, such as that disclosed in U.S. Pat. No. 5,906,727.

Polyalphaolefins

The extender oil may comprise a Poly-Alpha-Olefin (PAO), comprising oligomers of branched and/or linear alpha olefins. PAOs useful in the present invention comprise $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. Preferred PAO's comprise linear alpha olefins having 5 to 14 carbon atoms, more preferably 6 to 12 carbon atoms, more preferably 8 to 12 carbon atoms, still more preferably an average of about 10 carbon atoms.

In an embodiment, PAO's may include dimers, trimers, tetramers, pentamers, and the like of $C_5$ to $C_{14}$ α-olefins, preferably $C_6$ to $C_{12}$ α-olefins, more preferably $C_8$ to $C_{12}$ α-olefins. Suitable α-olefins include 1-pentene, 1-hexene, 1-heptene, 1-octene, 1-nonene, 1-decene, 1-undecene and/or 1-dodecene.

In a preferred embodiment, the alpha olefin is 1-decene, and the extender oil includes a mixture of dimers, trimers, tetramers and pentamers (and higher) of 1-decene. Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999).

Preferred PAO's may also have:

a kinematic viscosity at 100° C. of 10 cSt or more, more preferably 30 cSt or more, preferably 50 cSt or more, preferably 80 cSt or more, preferably 110 or more, preferably 150 cSt or more, preferably 200 cSt or more, preferably 500 cSt or more, preferably 750 or more, preferably 1000 cSt or more, preferably 1500 cSt or more, preferably 2000 cSt or more, still more preferably 2500 or more, preferably 10 cSt to 3000 cSt, preferably 10 cSt to 1000 cSt, still more preferably 10 cSt to 40 cSt; a viscosity at 100° C. of 0.1 to 3000 cSt, more preferably 0.5 to 1000 cSt, more preferably 1 to 250 cSt, more preferably 1 to 200 cSt, more preferably 10 to 500, more preferably 0.1 to 150 cSt, still more preferably less than 2 cSt; and/or a viscosity index of 90 or more, more preferably 100 or more, more preferably 105 or more, more preferably 110 or more, more preferably 115 or more, more preferably 120 or more, more preferably 125 or more, more preferably 130 or more, more preferably 140 or more, more preferably 150 or more, more preferably 190 or more, more preferably 200 or more, more preferably 250 or more, still more preferably 300 or more, more preferably 90 to 400, still more preferably 120 to 350; and/or a number average molecular weight (Mn) of 100 to 21,000, more preferably 200 to 10,000, more preferably 200 to 7,000, more preferably 200 to 2,000, still more preferably 200 to 500 g/mole; and/or a weight average molecular weight Mw of less than 20,000 g/mol, more preferably less than 10,000 g/mol, more preferably less than 5,000 g/mol, more preferably less than 4,000 g/mol, more preferably less than 2,000 g/mol, more preferably less than 500 g/mol, more preferably less than 100 g/mol; and/or a pour point of less than 0° C., more preferably −5° C. or less, more preferably −10° C. or less, more preferably −20° C. or less, still more preferably less than −40° C.; and/or a dielectric constant at 20° C. of less than 3.0, preferably less than 2.8, more preferably less than 2.5, more preferably less than 2.3, still more preferably less than 2.1; and/or a specific gravity (ASTM D 4052, 15.6/15.6° C.) of less than 0.920, more preferably less than 0.910, more preferably 0.650 to 0.900, more preferably 0.700 to 0.860, more preferably 0.750 to 0.855, more preferably 0.790 to 0.850, more preferably 0.800 to 0.840; and/or a boiling point of 100° C. to 500° C., more preferably 200° C. to 450° C., still more preferably 250° C. to 400° C.

In a preferred embodiment, the extender oil is a PAO comprising $C_6$ to $C_{14}$ olefins having a kinematic viscosity of 10 cSt or more at 100° C., and a viscosity index of 120 or more, preferably 130 or more, as determined by ASTM D-2270.

Desirable PAO's are commercially available under the tradename SHF and SuperSyn PAO's (ExxonMobil Chemical Company, Houston Tex.).

Other useful PAO's include those sold under the tradenames Synfluid™ available from ChevronPhillips Chemical Co. in Pasadena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA.

Polybutene

Polybutenes may be useful as extender oil's of the present invention. Suitable polybutenes, also referred to herein as polybutene processing oils, include homopolymers or copolymers of olefin derived units having from 3 to 8 carbon atoms, preferably from 4 to 6 carbon atoms. In a preferred embodiment, the polybutene is a homopolymer or copolymer of a $C_4$ raffinate. Examples of suitable polybutene polymers are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999).

Suitable polybutenes may include a copolymer comprising isobutylene derived units, 1-butene derived units, and/or 2-butene derived units. Preferred polybutenes include homopolymers, copolymers, and/or terpolymer of the three units or more. Preferred polybutenes include those in which isobutylene derived units comprise 40 to 100 wt %, preferably 40 to 99 wt %, more preferably 40 to 96 wt % of the polymer; and/or the 1-butene derived units comprise 0 to 40 wt %, preferably 2 to 40 wt % of the copolymer; and/or the 2-butene derived units comprise 0 to 40 wt %, more preferably 0 to 30 wt %, still more preferably 2 to 20 wt % of the polymer.

In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Preferred polybutenes may have a Mn of less than 15,000, and a Mw of 60,000 or less. Particularly preferred polybutene processing oils include those having a number average molecular weight (Mn) of less than 10,000 g/mol, more preferably less than 8000 g/mol, still more preferably less than 6000 g/mol; and/or a number average molecular weight Mn of greater than 400 g/mol, preferably greater than 700 g/mol, more preferably greater than 900 g/mol. A preferred embodiment can be a combination of any lower molecular weight limit with any upper molecular weight limit described herein. For example, in one embodiment of the polybutene of the invention, the polybutene has a number average molecular weight of from 400 g/mol to 10,000 g/mol, and from 700 g/mol to 8000 g/mol in another embodiment, and from 900 g/mol to 3000 g/mol in yet another embodiment.

Suitable polybutenes may also have a viscosity of greater than 35 cSt at 100° C., preferably greater than 100 cSt at 100° C., more preferably 10 to 6000 cSt at 100° C., still more preferably 35 to 5000 cSt at 100° C.

Commercial examples of useful polybutenes include the PARAPOL™ Series of processing oils (Infineum, Linden, N.J.), such as PARAPOL™ 450, 700, 950, 1300, 2400 and 2500 and the Infineum "C" series of polybutenes, including C9945, C9900, C9907, C9913, C9922, C9925 as listed below. The commercially available PARAPOL™ and Infineum Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by gel permeation chromatography. The MWD of the PARAPOL™ oils range from 1.8 to 3 in one embodiment, and from 2 to 2.8 in another embodiment; the pour points of these polybutenes are less than 25° C. in one embodiment, less than 0° C. in another embodiment, and less than −10° C. in yet another embodiment, and between −80° C. and 25° C. in yet another embodiment; and densities (IP 190/86 at 20° C.) range from 0.79 to 0.92 g/cm³, and from 0.81 to 0.90 g/cm³ in another embodiment.

Mineral Oils

Suitable extender oil's may also include mineral oils, which may be distinguished by their viscosity indices determined according to ASTM D-2270, and an amount of saturates and sulfur they contain. Hydrocarbon basestocks have been classified as Group I, II or III by the American Petroleum Institute (API). Group I basestocks are solvent refined mineral oils. They contain the most unsaturates and sulfur of the three groups, and have the lowest viscosity indices. Group II and Group III basestocks are referred to as High Viscosity Index and Very High Viscosity Index basestocks respectively. They are hydroprocessed mineral oils. The Group III oils contain less unsaturates and sulfur than the Group I oils, and have higher viscosity indices compared to Group II oils.

In an embodiment, extender oil's may comprise

Group I basestocks, including mineral oils that may have been refined using solvent extraction of aromatics, solvent dewaxing, and hydrofining to reduce sulfur content. Group I basestocks may have sulfur levels greater than 0.03 weight %, saturates levels of 60 to 80%, and a viscosity index of about 90 by ASTM D-2270; and/or Group II basestocks, including mineral oils that have been mildly hydrocracked with conventional solvent extraction of aromatics, solvent dewaxing, and more severe hydrofining to reduce sulfur levels to less than or equal to 0.03 weight %, as well as removing double bonds from some of the olefinic and aromatic compounds such that saturate levels are greater than 95-98% and the viscosity index is about 80-120 by ASTM D-2270; and/or Group III basestocks, including mineral oils that have been hydrotreated to comprise saturates levels greater than 95%, to virtually 100%, sulfur contents of less than or equal to 0.03 weight % (preferably between 0.001 and 0.01%), and VI is in excess of 120 by ASTM D-2270.

In another embodiment the extender oil comprises a Group III hydrocarbon basestock. Preferably the extender oil comprises a mineral oil having a saturates levels of 90% or more, preferably 92% or more, preferably 94% or more, preferably 96% or more, preferably 98% or more, preferably 99% or more, and sulfur contents less than 0.03%, preferably between 0.001 and 0.01% and a viscosity index of 120 or more, preferably 130 or more.

It has been unexpectedly discovered that when the instant bimodal polymer compositions comprise an extender oil, a balance between improved elasticity, processability, and flex resistance of the cured composition may be obtained at a blend molecular weight that can be prepared with greater than or equal to about 10 phr, and less than or equal to about 50 phr extender oil, wherein phr refers to parts by weight (of the extender oil) per hundred parts by weight (of the polymer) rubber.

Within this range, the extender oil may be present at greater than 15 phr, preferably greater than 20 phr, with greater than 25 phr being more preferred. Also within this range, the extender oil may be present at less than 48 phr, preferably less than 45 phr, with less than 43 phr being more preferred.

The multimodal polymer composition preferably has a Mooney viscosity of less than 90 ML(1+4@125° C.), preferably less than 70, and even more preferably less than 60. The multimodal polymer composition also preferably has a Mooney viscosity of at least 20 ML(1+4@125° C.), preferably at least 30, with at least 40 being more preferred.

The multimodal polymer composition preferably has an overall Mn between about 60,000 and 350,000 g/mol. Within this range, the multimodal polymer composition preferably has a Mn of at least 70,000, with at least 80,000 g/mol being preferred. The multimodal polymer composition also preferably has a Mn of less than 300,000, with less than 250,000 g/mol being more preferred.

The multimodal polymer composition preferably has an overall MWD between about 2 and 10. Within this range, the multimodal polymer composition preferably has a MWD of at least 3, with at least 3.5 being preferred. The multimodal polymer composition also preferably has a MWD of less than 8, with less than 7 being more preferred.

The multimodal polymer composition preferably has a BI between about 0.3 and 1. Within this range, the multimodal polymer composition preferably has a BI of at least 0.4, with at least 0.5 being preferred. The multimodal polymer composition also preferably has a BI of less than 0.95, with less than 0.9 being more preferred.

The multimodal polymer preferably comprises about 10 to about 65 mol % alpha-olefin, based on the total moles of the multimodal polymer present in the multimodal polymer composition. Within this range, the composition preferably comprises at least 15 mol %, with at least 25 mol % alpha-olefin being preferred. The multimodal polymer composition also preferably comprises less than 45 mol % alpha-olefin.

In an embodiment, the alpha-olefin is preferably propylene. In an embodiment, the multimodal polymer composition preferably comprises about 15 to about 70 mol % propylene, based on the total number of moles of the multimodal polymer present in the multimodal polymer composition.

Within this range, the multimodal polymer composition preferably comprises at least 20 mol %, with at least 30 mol % being preferred. The multimodal polymer composition also preferably comprises less than 50 mol % propylene.

The multimodal polymer composition preferably comprises about 0.1 to about 10 wt % (about 0.03 to about 3 mol %) diene, based on the total weight of the multimodal polymer composition. Within this range, the multimodal polymer composition preferably comprises at least 2.5 wt % (about 0.7 mol %), with at least 3 wt % (about 0.85 mol %) being preferred, and at least 4 wt % (about 1.15 mol %) diene being more preferred. The multimodal polymer composition also preferably comprises less than 8 wt % (about 2.3 mol %) diene, with less than 7 wt % (about 2 mol %) diene being more preferred.

In a preferred embodiment, the multimodal polymer composition comprises:
 i) 45 to 75 wt % of the first polymer fraction and 25 to 55 wt % of the second polymer fraction, and 30 to 50 phr oil, wherein the multimodal polymer composition has a number average molecular weight of greater than or equal to about 60,000, and less than or equal to less than or equal to about 350,000 g/mol, and a Mooney viscosity of less than or equal to less than or equal to 90 ML(1+ 4@125° C.), wherein the cured multimodal polymer composition has a Shore A hardness of greater than or equal to 50, less than or equal to 60, and a minimum fatigue to failure value, determined as cycles to failure at 140% stretch, of greater than or equal to about 10,000, preferably greater than or equal to about 20,000, with greater than or equal to about 30,000 being most preferred.

Cured Multimodal Polymer Compositions

The multimodal polymer compositions can be compounded with carbon black and optionally fillers (e.g., calcium carbonate, clay, wollastonite, and the like), plasticizers including oils and other compounding ingredients according to methods known in the art, and be cured (vulcanized) by contacting (e.g., compounding) the multimodal polymer composition with a curing agent. Examples of curing agents include sulfur, peroxide based curing agents, resin curing agents, silanes and hydrosilane curing agents, and the like, as described in "Vulcanization", Chapter 7 of "Science and Technology of Rubber", by A. Y. Coran, (F. R. Eirich editor) Academic Press Inc., 1978.

Peroxide curatives are generally selected from organic peroxides. Examples of organic peroxides include, but are not limited to, di-tert-butyl peroxide, dicumyl peroxide, t-butyl-cumyl peroxide, alpha, alpha-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, diaryl peroxides, ketone peroxides, peroxydicarbonates, peroxyesters, dialkyl peroxides, hydroperoxides, peroxyketals, and mixtures thereof.

The peroxide curatives are preferably employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime, and the like.

The cured multimodal polymer composition preferably has a Shore A hardness, determined according to ASTM D2240, of greater than or equal to 20 and less than or equal to 100. Within this range, the Shore A hardness is preferably greater than or equal to 45, more preferably greater than or equal to 50, with greater than or equal to 55 being still more preferred. Also within this range, the cured multimodal polymer composition preferably has a Shore A hardness of less than or equal to 60.

The cured multimodal polymer composition preferably has a minimum fatigue to failure value, determined as the minimum number of stretch cycles at 140% stretch achieved before sample failure measured with a Fatigue to Failure Tester (Monsanto Company model FF-1) operated at a frequency of 105 cycles/minute of greater than or equal to about 15,000, preferably greater than or equal to about 20,000, with greater than or equal to about 30,000 being most preferred.

In a preferred embodiment, the cured multimodal polymer composition further comprises fillers, oil, and optionally other additives such that the Shore A hardness is greater than or equal to about 50, and less than or equal to about 60, and the cured multimodal polymer composition has a minimum fatigue to failure value, determined as cycles to failure at 140% stretch, of greater than or equal to about 10,000, preferably greater than or equal to about 20,000, with greater than or equal to about 30,000 being most preferred.

The multimodal polymeric composition of the present invention preferably has a 100% Modulus of greater than or equal to 1 MPa and less than or equal to 5 MPa. Within this range, the 100% Modulus is preferably greater than or equal to 1.2 MPa more preferably greater than or equal to 1.5 MPa, with greater than or equal to 1.8 MPa being still more preferred. Also within this range, the 100% Modulus is less than or equal to 4 MPa, more preferably less than or equal to 3 MPa with less than or equal to 2.5 MPa being still more preferred.

The multimodal polymeric composition of the present invention preferably has a tensile strength of greater than or equal to 5 MPa and less than or equal to 20 MPa. Within this range, the tensile strength is preferably greater than or equal to 7 MPa more preferably greater than or equal to 9 MPa, with greater than or equal to 10 MPa being still more preferred. Also within this range, the tensile strength is less than or equal to 15 MPa, more preferably less than or equal to 13 MPa, with less than or equal to 11 MPa being still more preferred.

The multimodal polymeric composition of the present invention preferably has a % elongation at break of greater than or equal to 200% and less than or equal to 1000%. Within this range, the % elongation at break is preferably greater than or equal to 250% more preferably greater than or equal to 300%, with greater than or equal to 350% being still more preferred. Also within this range, the % elongation at break is less than or equal to 900%, more preferably less than or equal to 800%, with less than or equal to 500% being still more preferred.

The multimodal polymeric composition of the present invention preferably has an energy to break of greater than or equal to 1 J and less than or equal to 10 J. Within this range, the energy to break is preferably greater than or equal to 2 J more preferably greater than or equal to 2.5 J, with greater than or equal to 3 J being still more preferred. Also within this range, the energy to break is less than or equal to 8 J, more preferably less than or equal to 6 J, with less than or equal to 5 J being still more preferred.

The multimodal polymeric composition of the present invention preferably has a maximum tear resistance of greater than or equal to 1 kN/m and less than or equal to 10 kN/m. Within this range, the maximum tear resistance is preferably greater than or equal to 2 kN/m more preferably greater than or equal to 2.5 kN/m, with greater than or equal to 3 kN/m being still more preferred. Also within this range, the maximum tear resistance is less than or equal to 8 kN/m, more preferably less than or equal to 7 kN/m, with less than or equal to 5 kN/m being still more preferred.

The multimodal polymeric composition of the present invention preferably has a compression set 22 hours at 20° C., 25% Deflection determined according to ASTM D395 (B) of greater than or equal to 50% and less than or equal to 100%. Within this range, the compression set is preferably greater than or equal to 60% more preferably greater than or equal to 65%, with greater than or equal to 70% being still more preferred. Also within this range, the compression set is less than or equal to 90%, more preferably less than or equal to 80%, with less than or equal to 75% being still more preferred.

The multimodal polymeric composition of the present invention preferably has an average cycles till failure at 140% stretch achieved before sample failure measured with a Fatigue to Failure Tester (Monsanto Company model FF-1) operated at a frequency of 105 cycles/minute of greater than or equal to 2000 and less than or equal to 50,000. Within this range, the average cycles till failure at 140% stretch is preferably greater than or equal to 2,500 more preferably greater than or equal to 5,000, with greater than or equal to 10,000 being still more preferred. Also within this range, the average cycles till failure at 140% stretch is less than or equal to 40,000, more preferably less than or equal to 35,000, with less than or equal to 30,000 being still more preferred.

Formation of the Multimodal Polymer Composition

The multimodal polymer composition may be produced by a process comprising serial reactors, parallel reactors, or a combination thereof.

In an embodiment, the multimodal polymer composition may be produced by a process comprising the steps of:
a) passing a first set of monomers comprising ethylene, a $C_3$-$C_{10}$ alpha-olefin, and non-conjugated diene, and a first Ziegler-Natta catalyst system into a first reactor of a series of two or more reactors;
b) polymerizing the first set of monomers to produce a first reactor effluent comprising a first polymer fraction having a Mooney viscosity of greater than or equal to 150 ML(1+4@125° C.);
c) passing the first reactor effluent into a second reactor of the series of two or more reactors;
d) passing a second set of monomers comprising ethylene, a $C_3$-$C_{10}$ alpha-olefin, and non-conjugated diene, and a second Ziegler-Natta catalyst system into the second reactor;
e) polymerizing the second set of monomers in the presence of the first polymer fraction to produce a second reactor effluent comprising at least a portion of the first polymer fraction and a second polymer fraction having a Mooney viscosity of from about 20 ML(1+4@125° C.) to about 120 ML(1+4@125° C.); and
f) combining from about 10 phr to about 50 phr extender oil into the second reactor effluent to produce the multimodal polymer composition.

In a preferred embodiment, the multimodal polymer composition comprises:
i) 45 to 55 wt % of the first polymer fraction and 45 to 55 wt % of the second polymer fraction, wherein the multimodal polymer composition has a number average molecular weight of greater than or equal to about 60,000, and less than or equal to about 350,000 g/mol, and a Mooney viscosity of less than or equal to 90 ML(1+4@125° C.).

The catalyst system utilized in the first reactor may be the same or different from the catalyst system utilized in the second reactor. Preferably, the catalyst systems in both the first reactor and the second reactor are substantially the same. As used herein, the term "substantially the same" is used to indicate the same compound at the same concentration +/−5%. The term different with respect to either the concentration or the catalyst is used to indicate the same or a different compound and/or the same concentration +/−5% or a different concentration. The term substantially the same catalyst system is used to indicate the same activator (also referred to as a co-catalyst.) A different catalyst system is used to indicate a different catalyst or a different co-catalyst.

Catalyst systems useful in the instant processes for producing the multimodal polymer composition may comprise a transition metal catalyst of the type known in the art as Ziegler, (also referred to as Ziegler-Natta) catalysts, which include:
(a) a compound of a transition metal, i.e., a metal of Groups 3, 4, 5, 6, 7, 8, 9, 10, and/or 11 of the Periodic Table, and
(b) an organometal compound comprising a metal of Groups 1, 2, 12, and/or 13 of the Periodic Table.

The preferred catalyst system for use herein comprise a hydrocarbon soluble vanadium compound, in which the vanadium valence is 3 to 5, and an organo-aluminum compound, with the proviso that the catalyst system preferably yields one active catalyst species as described above. At least one of the vanadium compound/organo-aluminum pair selected for use herein must also contain a valence-bonded halogen.

Vanadium compounds useful in practicing the instant processes include those having the formula:
1)

wherein
x=0 to 3 and each R is independently a $C_1$-$C_{30}$ hydrocarbyl radical;
2) $VCl_4$;
3) $VO(AcAc)_2$,
where AcAc=acetyl acetonate;
4) $V(AcAc)_3$; where AcAc=acetyl acetonate;
5) $VOCl_x (AcAc)_{3-x}$, where AcAc=acetyl acetonate;
where x=1 or 2; and
6) $VCl_3$ nB, and mixtures thereof,
where n=2 or 3 and B=a Lewis base capable of making hydrocarbon-soluble complexes with $VCl_3$, including tetrahydrofuran, 2-methyl-tetrahydrofuran, dimethyl pyridine, and the like.

In the formulas above, R preferably represents a $C_1$ to $C_{10}$ aliphatic, alicyclic or aromatic hydrocarbon radical such as ethyl, phenyl, isopropyl, butyl, propyl, n-butyl, i-butyl, hexyl, cyclohexyl, octyl, naphthyl, and the like. Non-limiting, illustrative examples of formula (1) compounds include vanadyl trihalides, alkoxy halides and alkoxides such as $VOCl_3$ $VOCl_2$ (OBu) where Bu=butyl, and $VO(OC_2H_5)_3$. The most preferred vanadium compounds are $VCl_4$, $VOCl_3$, and $VOC_2$ (OR), wherein R preferably represents a $C_1$ to $C_{10}$ aliphatic, alicyclic or aromatic hydrocarbon radical.

The organo-aluminum compound (also referred to as a co-catalyst) is preferably represented by the formula:

AlR$_3$, Al(OR')R$_2$, AlR$_2$Cl, R$_2$Al—O—AlR$_2$, AlR'RCl,
AlR$_2$I, Al$_2$R$_3$Cl$_3$, AlRCl$_2$, and mixtures thereof, wherein R and R' each independently represent C$_1$ to C$_{30}$ aliphatic, alicyclic or aromatic hydrocarbon radicals as described above with respect to the vanadium compound formulas. A preferred organo-aluminum compound is Al$_2$R$_3$Cl$_3$, wherein R is defined as above. The most preferred organo-aluminum co-catalyst is ethyl aluminum sesquichloride (EASC), represented by the formula Al$_2$Et$_3$Cl$_3$.

In a preferred embodiment, the catalyst comprises VOCl$_3$ and Al$_2$R$_3$Cl$_3$, preferably where R is ethyl, having a mole ratio of aluminum/vanadium (Al:V mole ratio) of greater than or equal to 2, with a preferred minimum Al:V mole ratio of about 4, and a maximum Al:V mole ratio of about 25, a preferred maximum of about 17, and a most preferred maximum Al:V mole ratio of about 15.

The catalyst components are preferably not premixed and aged before introduction into the reactors.

Chain transfer agents such as hydrogen or diethyl zinc may be added to the first reactor, the second reactor or subsequent reactors, or a combination thereof, of the process. Other chain transfer agents include NH$_3$ and/or other amines and/or silanes comprising C$_1$-C$_{10}$ alkyl groups, which may be added to the reaction to reduce the acidity of the polymerization system and thus control long chain branching.

In an embodiment, the first Ziegler-Natta catalyst system and the second Ziegler-Natta catalyst system each comprise vanadium.

In a preferred embodiment, hydrogen is fed into the first reactor and into the second reactor according to the equation:

$$\frac{(H_2/V)_{R1}}{(H_2/V)_{Overall}} > 1.43 \times \left[ \frac{(\text{Catalyst Efficiency})_{R1}}{(\text{Catalyst Efficiency})_{Overall}} \right]^{-1.67}$$

wherein:

$(H_2/V)_{R1}$ is the molar ratio of the moles of hydrogen fed into the first reactor to the moles of catalyst fed to the first reactor;

$(H_2/V)_{Overall}$ is the molar ratio of the moles of hydrogen fed into both the first reactor and into the second reactor to the moles of catalyst fed to both the first and second reactors;

(Catalyst Efficiency)$_{R1}$ is the catalyst efficiency of the first catalyst system in the first reactor, calculated by dividing the production rate in the first reactor by the mass amount of catalyst fed to the first reactor; and (Catalyst Efficiency)$_{OVERALL}$ is the catalyst efficiency of the first and second reactors combined, calculated by dividing the combined production rate from both reactors by the total catalyst feed (mass rate) to both reactors.

The actual (H$_2$/V) ratio when measured in the process preferably exceeds the value calculated by equation (3). Preferably, the ratio of Equation (3) value to the Actual Ratio of (Equation 3/(H$_2$/V) Ratio Actual) is less than or equal to about 1.0, preferably less than or equal to about 0.9, preferably less than or equal to about 0.8, with preferably less than or equal to about 0.7 being more preferred. This ratio is preferably greater than or equal to 0.1, more preferably greater than or equal to 0.2 and more preferably greater than or equal to 0.3.

Any known solvent for the reaction mixture may be used in conducting the polymerization steps. Suitable solvents include C$_4$-C$_{20}$ hydrocarbon solvents such as aliphatic, cycloaliphatic and aromatic hydrocarbon solvents, or halogenated versions of such solvents. Preferred solvents include C$_4$-C$_{12}$ straight chain or branched chain, saturated hydrocarbons, C$_5$ to C$_9$ saturated alicyclic hydrocarbons, C$_5$ to C$_{20}$ aromatic hydrocarbons, C$_2$ to C$_{12}$ halogenated hydrocarbons, or combinations thereof. Non-limiting illustrative examples of preferred solvents include butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, di-chloroethane, and/or trichloroethane.

Extender oil, and optionally other additives may be added to the first reactor product, to the second reactor product, or to both the first reactor product and the second reactor product. Preferably, the extender oil is added in total to the second reactor product, provided that the oil is not poison to the catalyst.

In a preferred embodiment, the first high molecular weight fraction is produced in the first reactor, and the second low molecular weight fraction is produced in the second reactor. Conditions between the first and the second reactor may be differentiated as determined by the target molecular weight, and other desired properties of the various fractions.

After polymerization, and any catalyst deactivation, the solvent, if present, can be removed by one or more flashing steps, solvent devolatilization steps, steam stripping, and/or by utilizing a liquid phase separation. Preferably, the solvent content in the final composition is less than or equal to about 0.1 wt %. At least a portion of the removed solvent can be recycled back into the process, and the multimodal polymer composition may then be further processed including being compounded with additives, being cured, being baled, pelletized, derivatized, or otherwise processed.

In a preferred embodiment, a hydrocarbon solvent is utilized in both the first reactor and in the second reactor, and the extender oil is added to the second reactor product. The solvent is then removed from the second reactor product by distillation, typically through steam stripping which includes the application of steam to the second reactor product. The solvent is then recovered, purified, and reused in the process (e.g., in the first reactor, the second reactor, or both.) The large difference between the boiling points of the oil and the solvent (e.g., hexane) allow for efficient removal of the solvent from the multimodal polymer composition in the instant process.

In an embodiment, the multimodal polymer composition may be produced by a process comprising the steps of:

a) adding a first set of monomers comprising ethylene, a C$_3$-C$_{10}$ alpha-olefin, and non-conjugated diene, a C$_4$-C$_{20}$ hydrocarbon solvent, and a first Ziegler-Natta catalyst system into a first reactor of a series of two or more reactors;

b) polymerizing the first set of monomers to produce a first reactor effluent comprising a first polymer fraction having a Mooney viscosity of greater than or equal to 150 ML(1+4@125° C.);

c) directing the first reactor effluent into a second reactor of the series of two or more reactors;

d) adding a second set of monomers comprising ethylene, a C$_3$-C$_{10}$ alpha-olefin, and non-conjugated diene, a second Ziegler-Natta catalyst system, and optionally a C$_4$-C$_{20}$ hydrocarbon solvent into the second reactor;

e) polymerizing the second set of monomers in the presence of the first polymer fraction to produce a second reactor effluent comprising at least a portion of the first polymer fraction and a second polymer fraction having a Mooney viscosity of greater than or equal to 20 ML(1+4@125° C.), and less than or equal to 120 ML(1+4@125° C.);

f) adding from about 10 to about 50 phr extender oil into the second reactor effluent;

g) steam stripping the second reactor effluent to remove at least a portion of the solvent to produce the multimodal polymer composition.

The instant process may further include the steps of collecting and purifying at least a portion of the removed solvent to produce a recovered solvent, and/or recycle of the recovered solvent back into the process. Preferably, the recovered solvent is recycled back into the process at the addition step a), at the addition step d), or both.

The first reactor is preferably operated within a temperature range of −40° C. to about 80° C. Within this range, a temperature of at least 0° C. is preferred, with at least 15° C. being more preferred and at least 20° C. being more preferred. The temperature is also preferably less than 65° C., with less than 45° C. being more preferred.

The residence time in the first reactor is preferably in the range of 3 minutes to about 30 minutes. Within this range, a residence time of at least 4 minutes is preferred, with at least 5 minutes being more preferred and at least 6 minutes being more preferred. The residence time is also preferably less than 20 minutes with less than 15 minutes being more preferred.

The second reactor or reactors is/are preferably operated within a temperature range of −40° C. to about 80° C. Within this range, a temperature of at least 0° C. is preferred, with at least 20° C. being more preferred and at least 40° C. being more preferred. The temperature is also preferably less than 65° C., with less than 50° C. being more preferred.

The residence time in the second reactor or reactors is/are preferably in the range of 2 minutes to about 30 minutes. Within this range, a residence time of at least 3 minutes is preferred, with at least 4 minutes being more preferred and at least 5 minutes being more preferred. The residence time is also preferably less than 15 minutes, with less than 10 minutes being more preferred.

INDUSTRIAL APPLICATIONS

The multimodal polymer compositions disclosed herein may be used in a wide variety of applications where increased processability needs to be balanced with resilience and aging. Examples include: engine mounts, transmission mounts, chassis/suspension insulators, exhaust mounts, drive shaft dampers, strut mounts, crankshaft pulleys, leafspring dampers, radiator mounts, front and rear bumper mountings, steering wheel mounts, seating, bushings, A/C clutch assemblies, and hydromounts. Vibration damping devices comprising the instant multimodal polymer composition may also used in household electrical appliances such as air-conditioners, laundry machines, refrigerators, electric fans, vacuums, dryers, audio equipment, and the like.

EXAMPLES

The following examples were prepared from the components listed below.

Components

| EPDM Rubber | Description | Available from |
|---|---|---|
| Vistalon ® 3666 | EPDM rubber extended with 75 phr oil[(2)] | ExxonMobil Chemical Company |
| Spheron ® 5000 A | Furnace carbon black[(2)] | Cabot Corp. |
| Flexon ® 815 | Paraffinic oil (d = 0.895 @ 15 C., viscosity = 31.8 cSt @ 100 C.) | ExxonMobil Chemical Company |
| ZnO (Red Seal) | Zinc oxide activator | |
| Stearic Acid | | |
| Agerite ® Resin D | Trimethylhydroxyquinoline antioxidant | R. T. Vanderbilt |
| Struktol ® WB 212 | Emulsion of high molecular weight fatty acid ester plasticizer | Struktol Company of America |
| Sulphur | | |
| MBTS | Mercaptobenzothiazole disulfide/accelerator | |
| ZDBC | Zinc dibutyldithiocarbamate/accelerator | |
| TMTD | Tetramethylthiuram disulfide/sulfur donor | |
| DTDM | Dithiodimorpholine/sulfur donor | |

(1): Mooney voscosity: (1 + 4 @ 125 C.): 52, ethylene content: 64 wt %, ENB content: 4.2 wt %.
[(2)]Carbon black of structure similar to ASTM N 550 or N 659 blacks but having lower surface area.

Polymerization Procedure:

Polymerizations were carried out in a series of two 628 liter stirred reactors with continuous flow of feed to the system and continuous withdrawal of product. Reactor temperature was controlled by controlling the chilling of the feed. The reactors were operated liquid full at a pressure of about 700 kPa.

Ethylene, propylene and ENB feeds were combined into one stream with hexane. The catalyst $VOCl_3$ and co-catalyst Sesqui were fed separately to the reactor. The product from the reactor was deashed through a set of deashing vessels in which the hydrocarbon stream was contacted in countercurrent flow with water. The water was removed by settling and the deashed hydrocarbon phase was blended by on-line metering of the extender oil, if used, and fed into a flash drum in which, a flowing stream of steam in hot water precipitated the polymer by removing the solvent into the vapor phase. The polymer crumb that resulted was dried in several steps through extrusion drying and the dry rubber was baled into the final product.

The range of reactor conditions exemplified herein is shown in the following series of Tables, which provide the values of process parameters such as reactor temperature, residence time and cement concentration (wt % of polymer in the effluent). Also provided in these tables are the parameters that are calculated from the feed rates of individual components. These include the molar ratio of the co-catalyst to catalyst (Al/V), hydrogen used as chain-transfer agent for MW control to catalyst ($H_2$/V), ammonia (if used) as control agent for long chain branching to catalyst (N/V), polymerization rate obtained by heat balance, polysplit (% of total production made in the first reactor) and the individual monomer conversions obtained as the ratio of monomer amount in the polymer to the monomer amount fed to the reactor. The monomer amount in the polymer is the product of production rate and polymer composition derived from FT-IR measurements.

In these examples, molecular weight (as determined by the Mooney viscosity) of the high MW component (MST) made in the first reactor and the final product MW (MST or ML) shown was controlled by changes to the hydrogen feed to each of the reactors. The oil extended Mooney viscosity was always measured with the ML rotor. The polysplit was controlled by varying the monomer feed rates to each of the reactors. The composition of each of the components was controlled by the relative concentration of monomers in the feed to each of the reactors.

Comparative Examples 1 and 5 were prepared consistent with WO 2003 066725A2, without extender oil. These EPDM polymers contain about 50 wt % of a polymer fraction having a Mooney viscosity in the range of 10 to 20 and about 50 wt % of a polymer fraction having a Mooney viscosity of about 200-250.

The samples were prepared via a Ziegler-Natta catalyzed process. The process conditions for preparing the polymer in Example 2 are found in Table 1:

TABLE 1

|  | Reactor 1 | Reactor 2 (or overall) |
|---|---|---|
| Catalyst Efficiency (kg pol./kg cat.) | 704 | 547 |
| Al/V (mol/mol) | 6.5 | 5.4 |
| $H_2$/V (mol/mol) | 0.52 | 0.36 |
| Polymerization rate (kg/h) | 65 | 129 |
| Polysplit (%) | 50% | 50% |
| Residence Time (min) | 11.7 | 7.5 |
| Reactor Temperature (° C.) | 20.0 | 44.9 |
| Cement concentration (% wt) | 3.1 | 4.1 |
| Conv $C_2$= (%) | 100 | 58 |
| Conv $C_3$= (%) | 62 | 46 |
| Conv ENB (%) | 98 | 90 |

The process conditions for preparing the polymer in Example 3 are found in Table 2:

TABLE 2

|  | Reactor 1 | Reactor 2 (or overall) |
|---|---|---|
| Catalyst Efficiency (kg pol./kg cat.) | 699 | 560 |
| Al/V (mol/mol) | 6.5 | 5.5 |
| $H_2$/V (mol/mol) | 0.52 | 0.41 |
| Polymerization rate (kg/h) | 65 | 130 |
| Polysplit (%) | 50% | 50% |
| Residence Time (mn) | 11.7 | 7.4 |
| Reactor Temperature (° C.) | 20.0 | 45.3 |
| Cement concentration (% wt) | 3.1 | 4.1 |
| Conv $C_2$= (%) | 100 | 59 |
| Conv $C_3$= (%) | 61 | 46 |
| Conv ENB (%) | 94 | 92 |

The process conditions for preparing the polymer in Example 4 are found in Table 3:

TABLE 3

|  | Reactor 1 | Reactor 2 (or overall) |
|---|---|---|
| Catalyst Efficiency (kg pol./kg cat.) | 1184 | 543 |
| Al/V (mol/mol) | 5.9 | 5.3 |
| $H_2$/V (mol/mol) | 0.21 | 0.30 |
| N/V (mol/mol) | 1.3 |  |
| Polymerization rate (kg/h) | 71 | 140 |
| Polysplit (%) | 51% | 49% |
| Residence Time (mn) | 11.2 | 7.3 |
| Reactor Temperature (° C.) | 20.0 | 45.0 |
| Cement concentration (% wt) | 3.4 | 4.6 |
| Conv $C_2$= (%) | 100 | 60 |
| Conv $C_3$= (%) | 47 | 56 |
| Conv ENB (%) | 94 | 98 |

The process conditions for preparing the polymer in Comparative Example 1 are found in Table 4:

TABLE 4

|  | Reactor 1 | Reactor 2 (or overall) |
|---|---|---|
| Catalyst Efficiency (kg pol./kg cat.) | 732 | 705 |
| Al/V (mol/mol) | 6.0 | 5.1 |
| $H_2$/V (mol/mol) | 0.40 | 1.27 |
| Polymerization rate (kg/h) | 68 | 133 |
| Polysplit (%) | 51% | 49% |
| Residence Time (mn) | 11.0 | 7.2 |
| Reactor Temperature (° C.) | 20.0 | 41.6 |
| Cement concentration (% wt) | 3.1 | 4.0 |
| Conv $C_2$= (%) | 104.1 | 61.9 |
| Conv $C_3$= (%) | 60.6 | 52.2 |
| Conv ENB (%) | 100.5 | 93.8 |

The process conditions for preparing the polymer in Comparative Example 5 are found in Table 5:

TABLE 5

|  | Reactor 1 | Reactor 2 (or overall) |
|---|---|---|
| Catalyst Efficiency (kg pol./kg cat.) | 1150 | 490 |
| Al/V (mol/mol) | 6.6 | 5.4 |
| $H_2$/V (mol/mol) | 0.07 | 0.82 |
| N/V (mol/mol) | 1.3 |  |
| Polymerization rate (kg/h) | 67 | 133 |
| Polysplit (%) | 50% | 50% |
| Residence Time (mn) | 11.3 | 7.2 |
| Reactor Temperature (° C.) | 20.0 | 42.8 |
| Cement concentration (% wt) | 3.1 | 4.1 |
| Conv $C_2$= (%) | 100 | 60 |
| Conv $C_3$= (%) | 47 | 48 |
| Conv ENB (%) | 97 | 92 |

Comparative Example 6 was a commercial monomodal EPDM polymer composition extended with 75 phr oil. Comparative Example 6 had a Mooney viscosity of about 250 ML(1+4@125° C.) in the absence of extender oil. This material is commercially available from ExxonMobil Chemical Company under the trade name Vistalon® 3666 (V3666).

Examples 2, 3, and 4 comprised 50-52 wt % of a first polymer component having a Mooney viscosity of about 250, and a second polymer component having a Mooney viscosity of about 60 to 85. These polymers were extended with 30-40 phr oil. Without oil extension, these polymers had a Mooney viscosity of between 130 and 143, which rendered them unprocessable.

The molecular weight, as evidence by the Mooney viscosity of the fraction made in each of the two reactors can be controlled by the addition of a chain transfer agent such as hydrogen. The hydrogen requirement is influenced by the choice of catalyst efficiency (weight of polymer made per unit weight of catalyst) and the use, if any, of branching control agent such as ammonia. At a given catalyst efficiency and ammonia feed to the two reactors, the ratio of hydrogen feed, (expressed as a ratio moles of hydrogen to moles of catalyst fed) to the first reactor to the total hydrogen feed to both reactors has to be controlled to achieve the desired benefits of the invention. This ratio should follow equation (3):

$$\frac{(H_2/V)_{R1}}{(H_2/V)_{Overall}} > 1.43 \times \left[\frac{(\text{Catalyst Efficiency})_{R1}}{(\text{Catalyst Efficiency})_{Overall}}\right]^{-1.67} \quad \text{Eq. (3)}$$

The ratios calculated according to equation (3) and the actual values are shown for each example in Table 6:

TABLE 6

| | R1 $H_2/V$ | Overall $H_2/V$ | R1 Catalyst Efficiency | Overall Catalyst Efficiency | Catalyst Efficiency Ratio | Equation (3) | $(H_2/V)$ Ratio Actual | Equation (3)/ $(H_2/V)$ Ratio Actual |
|---|---|---|---|---|---|---|---|---|
| Comp EX-1 | 0.4 | 1.27 | 732 | 705 | 1.04 | 1.34 | 0.31 | 4.26 |
| EX-2 | 0.52 | 0.4 | 704 | 547 | 1.29 | 0.94 | 1.44 | 0.65 |
| EX-3 | 0.52 | 0.41 | 699 | 560 | 1.25 | 0.99 | 1.27 | 0.78 |
| EX-4 | 0.21 | 0.3 | 1184 | 543 | 2.18 | 0.39 | 0.70 | 0.56 |
| Comp EX-5 | 0.07 | 0.82 | 1150 | 490 | 2.35 | 0.34 | 0.09 | 4.03 |

The actual ratio exceeded the value calculated by equation (3) for the inventive examples and failed to do so for the comparative examples.

The Mooney viscosities of the second polymer fractions (ML F2 calc) were calculated using Equation 1 as described herein. The second polymer fractions of the Examples have higher molecular weights than those of Comparative Examples 1 and 5. Accordingly, the resulting number average molecular weights of the Examples are higher than those of Comparative Examples 1 and 5. Both Example 4 and Comparative Example 5 were prepared in the presence of $NH_3$ to reduce the acidity of the polymerization system and thus decrease the level of long chain branching in the polymers. The specific compositions are disclosed in Table 7.

TABLE 7

Elastomers

| Example | ML Fraction 1* | ML Reactor 2**** | ML Fraction 2 (calc)** | % Fraction 1 | Mn × 1000 | Tan (δ) Reactor product | Oil phr | Tan (δ) Oil extended product | ML overall | BI |
|---|---|---|---|---|---|---|---|---|---|---|
| Comp Ex. 1 | 190 | 49 | 13 | 51 | 38 | 0.53 | 0 | n/a | 49 | |
| Ex. 2 | 250 | 142 | 82 | 50 | 96 | 0.48 | 40 | 0.56 | 52 | 0.56 |
| Ex. 3 | 260 | 130 | 65 | 50 | 87 | 0.52 | 30 | 0.59 | 53 | 0.53 |
| Ex. 4 | 260 | 130 | 65 | 50 | 102 | 0.45 | 35 | 0.52 | 58 | 0.86 |
| Comp.+ Ex. 5 | 260 | 72 | 18 | 52 | 55 | 0.47 | 0 | n/a | 72 | |
| Comp.+ Ex. 6*** | 250 | n/a | n/a | 100 | 170 | 0.32 | 75 | 0.5 | 52 | |

Notes
+ + $NH_3$ added to the reactor to reduce level of long chain branching
*calculated from MST
**calculated Mooney of the polymer fraction made in the $2^{nd}$ reactor.
***Vistalon ® 3666 commercial monomodal high Mol. Wt. Polymer with 75 phr extender oil, (ExxonMobil, Baytown, Texas.)
****ML (1 + 4 @ 125° C.) or calculated from MST(5 + 4 @ 200° C.)

As shown in Tables 8 and 9, the multimodal polymers listed in Table 7 were then formulated with various additives to produce multimodal polymer compositions suitable for use in an engine-mount (e.g., motor-mount) type of application. The Examples and the Comparative Examples were mixed in 2 passes using a conventional Farrel Banbury type mixer of 1600 cc (Net Chamber Volume) according to the following mixing conditions:

| | |
|---|---|
| Loading: | 70% NCV; |
| Ram pressure: | 2 kg. |
| Rotor Speed: | 90 rpm (first pass mixing) |
| | 70 rpm (second pass mixing) |

Mixing temperatures at start:

| | |
|---|---|
| First pass: | 70° C. |
| Second pass: | 40° C. (constant cooling applied) |
| Mixing time: | 3.5 min first pass |
| | 1.0 min second pass |

The mixing cycle comprised the steps:

| Time (Min.) | Action |
|---|---|
| 0.0 | add Polymer/ram down |
| 0.5 | add Fillers, oil-additives |
| 1.5 | Sweep after power peak |
| 3.5 | Ram up |
| 3.75 | Dump |

TABLE 8

Formulations

| Component (phr) | Comp Ex. 7 | Comp Ex. 8 | Comp Ex. 9 | Comp Ex. 10 | Comp Ex. 11 | Comp Ex. 12 | Comp Ex. 13 | Example 14 | Example 15 | Comp. Ex. 16 | Example 17 | Comp Ex. 18 | Example 19 |
|---|---|---|---|---|---|---|---|---|---|---|---|---|---|
| Comp Ex. 6 | 175 | | | | | | | | | | | 175 | |
| Comp Ex. 1 | | 100 | 100 | 140 | 175 | | | | | | | | |
| Comp Ex. 5 | | | | | | 175 | 140 | | | | | | |
| Example 2 | | | | | | | | 175 | 140 | | | | |
| Example 3 | | | | | | | | | | 175 | 130 | | |
| Example 4 | | | | | | | | | | | | | 135 |
| Spheron 5000 | 70 | 70 | 70 | 70 | 70 | 70 | 70 | 70 | 70 | 70 | 70 | 70 | 70 |
| Flexon 815 | 0 | 75 | 45 | 35 | 0 | 0 | 35 | 0 | 35 | 0 | 45 | 0 | 40 |
| ZnO | 5 | 5 | 5 | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 | 1 | 1 | 1 |
| Agerite Resin D | 0.4 | 0.4 | 0.4 | 0.4 | 0.4 | 0.4 | 0.4 | 0.4 | 0.4 | 0.4 | 0.4 | 0.4 | 0.4 |
| Struktol WB 212 | 3 | 3 | 3 | 3 | 3 | 3 | 3 | 3 | 3 | 3 | 3 | 3 | 3 |
| Sulphur | 0.1 | 0.1 | 0.1 | 0.1 | 0.1 | 0.1 | 0.1 | 0.1 | 0.1 | 0.1 | 0.1 | 0.1 | 0.1 |
| Sulphur | 1.2 | 1.2 | 1.2 | 1.2 | 1.2 | 1.2 | 1.2 | 1.2 | 1.2 | 1.2 | 1.2 | 1.2 | |
| MBTS (80%) | 1.3 | 1.3 | 1.3 | 1.3 | 1.3 | 1.3 | 1.3 | 1.3 | 1.3 | 1.3 | 1.3 | 1.3 | |
| ZDBC (80%) | 1 | 1 | 1 | 1 | 1 | 1 | 1 | 1 | 1 | 1 | 1 | 1 | |
| TMTD (100%) | 0.8 | 0.8 | 0.8 | 0.8 | 0.8 | 0.8 | 0.8 | 0.8 | 0.8 | 0.8 | 0.8 | 0.8 | |
| DTDM (80%) | 1 | 1 | 1 | 1 | 1 | 1 | 1 | 1 | 1 | 1 | 1 | 1 | |

TABLE 9

Mixing Characteristics

| Mixing Condition | Comp 7 | Comp 8 | Comp 9 | Comp 10 | Comp 11 | Comp 12 | Comp 13 | Example 14 | Example 15 | Comp 16 | Example 17 | Comp 18 | Example 19 |
|---|---|---|---|---|---|---|---|---|---|---|---|---|---|
| Start Temp.(° C.) | 73 | 65 | 65 | 70 | 69 | 71 | 70 | 70 | 70 | 69 | 70 | 68 | 67 |
| Sweep Time @ 90° C. (min:sec) | 1:50 | 1:45 | 1:30 | 1:10 | 1:10 | 1:10 | 1:20 | 1:10 | 1:20 | 1:15 | 1:30 | 1:15 | 1:25 |
| Ramp up Temp. ° C. | 130 | 116 | 132 | 146 | 146 | 144 | 152 | 140 | 128 | 142 | 129 | 127 | 132 |
| Dump Temp. ° C. | 131 | 120 | 134 | 146 | 150 | 150 | 152 | 140 | 132 | 143 | 138 | 130 | 139 |
| Dump Time (min:sec) | 3:45 | 3:45 | 3:45 | 3:45 | 3:45 | 3:45 | 3:45 | 3:45 | 3:45 | 3:45 | 3:45 | 3:45 | 3:45 |
| Energy Consumption (Wh) | 229 | 188 | 219 | 244 | 289 | 284 | 271 | 256 | 227 | 285 | 232 | 256 | 244 |

Notes:
*Dump Behavior C—Crumbs; A—Acceptable; P—pieces
**Milling Behavior B—Bagging; A—Acceptable The rheological and physical properties of Examples 8-17 and 19, and the Comparative Examples 7-13, and 18 are listed in Tables 10 and 11.

TABLE 10

| | Comp 7 | Comp 8 | Comp 9 | Comp 10 | Comp 11 | Comp 12 | Comp 13 | Example 14 | Example 15 | Comp 16 | Example 17 | Comp 18 | Example 19 |
|---|---|---|---|---|---|---|---|---|---|---|---|---|---|
| Polymer/oil ratio | 100/75 | 100/75 | 100/45 | 140/35 | 175/0 | 175/0 | 140/35 | 125/50 | 100/75 | 135/40 | 100/75 | 100/75 | 100/75 |
| Mooney Viscosity ML(1 + 4 @125° C. | 52 | 47 | 43 | 43 | 43 | 72 | 72 | 52 | 52 | 53 | 53 | 54 | 55 |
| MLRA (MU sec.) | 586 | 625 | 507 | 464 | 464 | 810 | 810 | 665 | 665 | 624 | 624 | 612 | 560 |
| Compound Rheology | | | | | | | | | | | | | |
| Mooney ML(1 + 4 @ 100° C.) | 71 | 19 | 33 | 42 | 71 | 112 | 67 | 78 | 47 | 89 | 41 | 68 | 48 |
| Mooney Scorch 125° C. | | | | | | | | | | | | | |
| ML [MU] | 29 | 7 | 12 | 15 | 26 | 45 | 26 | 29 | 16 | 34 | 14 | 28 | 18 |
| Ms t2 (min) | 15.4 | 20.6 | 14.7 | 20.9 | 18.9 | 16.2 | 18.1 | 16.4 | 19.6 | 12.3 | 20.4 | 13.9 | 17.5 |
| Ms t5 (min) | 19.0 | 27.5 | 19.7 | 26.9 | 23.4 | 19.2 | 22.5 | 20.3 | 24.6 | 15.0 | 25.8 | 17.9 | 21.9 |
| Ms t10 (min) | 22.4 | | 24.1 | | 28.3 | 22.0 | 26.1 | 23.9 | 29.6 | 17.9 | | 21.4 | 25.5 |
| MDR arc +/−0.5, 180° C. | | | | | | | | | | | | | |
| ML (dNm) | 1.8 | 0.4 | 0.8 | 0.9 | 1.6 | 3.1 | 1.7 | 1.8 | 1.0 | 2.1 | 0.8 | 1.8 | 1.1 |
| MH (dNm) | 12.9 | 9.8 | 14.9 | 15.7 | 20.9 | 25.6 | 18.2 | 19.0 | 13.6 | 23.8 | 13.0 | 13.2 | 12.7 |
| MH − ML (dNm) | 11.1 | 9.4 | 14.2 | 14.8 | 19.3 | 22.6 | 16.5 | 17.3 | 12.7 | 21.7 | 12.2 | 11.4 | 11.6 |
| Ts2 (min) | 1.1 | 1.6 | 1.2 | 1.3 | 1.1 | 0.9 | 1.1 | 1.1 | 1.3 | 0.9 | 1.3 | 1.1 | 1.2 |
| Tc90 (min) | 3.1 | 4.3 | 3.7 | 3.8 | 3.5 | 3.4 | 3.7 | 3.5 | 3.8 | 3.2 | 4.0 | 2.9 | 3.5 |
| Peak Rate (dNm/min) | 6.7 | 5.5 | 9.5 | 9.5 | 13.0 | 16.2 | 11.5 | 11.1 | 7.5 | 15.2 | 7.4 | 7.1 | 7.4 |

Physical testing of rubbers is described in "Introduction to Rubber Technology" chapter 19, Ed. M. Morton, Van Nostrand Reinhold Co. 1969 and in "Physical testing of Rubbers" Rapra review report 5 (10), 1992, Rapra Ed.
ML is the Mooney viscosity of the compound at the given temperature measured with the large rotor,
Ms is the Mooney scorch value,
Ts is the time to scorch,
Tsn is the time for the Mooney viscosity of the compound to increase by n points (i.e. Ts2, Ts5 and Ts10).
Mh is the highest Mooney torque value measured in the MDR cure test. Tc 90 is the time to reach 90% of the Mh. The peak cure rate is the tangent to the sigmoid cure rate curve.

TABLE 11

Physical Properties

| | Comp 7 | Comp 8 | Comp 9 | Comp 10 | Comp 11 | Comp 12 | Comp 13 | Example 14 | Example 15 | Comp 16 | Example 17 | Comp 18 | Example 19 |
|---|---|---|---|---|---|---|---|---|---|---|---|---|---|
| Tensile DIN 53504-S2 (1974) | | | | | | | | | | | | | |
| Shore A Hardness 3 sec/30 sec | 51/50 | 47/45 | 57/55 | 55/53 | 62/60 | 65/63 | 58/57 | 58/57 | 51/50 | 65/64 | 51/50 | 52/51 | 51/50 |
| Modulus 100% (MPa) | 1.9 | 1.5 | 2.3 | 1.9 | 2.4 | 3.3 | 2.1 | 2.3 | 1.8 | 3.6 | 1.7 | 2.0 | 1.7 |
| Modulus 300% (MPa) | 6.5 | 5.8 | 8.3 | 6.6 | 8.4 | 12.2 | 7.5 | 8.2 | 6.2 | 11.8 | 5.8 | 7.2 | 5.9 |
| Tensile Strength (MPa) | 12.0 | 10.4 | 12.8 | 11.8 | 13.8 | 16.8 | | 10.1 | 10.4 | 13.2 | 10.9 | 12.4 | 10.8 |
| Elongation at break (%) | 485 | 484 | 426 | 460 | 425 | 360 | 440 | 360 | 460 | 325 | 490 | 450 | 475 |
| Energy to Break (J) | 4.7 | 3.6 | 4.2 | 3.9 | 5.1 | 6.2 | 4.4 | 3.8 | 3.4 | 4.4 | 4.4 | 4.1 | 4.1 |
| Tear Resistance DIN 53507A (1969) | | | | | | | | | | | | | |
| Max Tear Resistance (kN/m) | 41 | 4.6 | 5.4 | 4.9 | 5.0 | 5.2 | 4.5 | 3.8 | 3.6 | 3.8 | 4.1 | 3.8 | 4.0 |
| Compression Set ASTM D395-03 (B) | | | | | | | | | | | | | |
| 22 h @−20° C. 25% Deflection (%). | 69 | 78 | 74 | 85 | 80 | 89 | 87 | 71 | 71 | 72 | 73 | 69 | 83 |

TABLE 11-continued

Physical Properties

| | Comp 7 | Comp 8 | Comp 9 | Comp 10 | Comp 11 | Comp 12 | Comp 13 | Example 14 | Example 15 | Comp 16 | Example 17 | Comp 18 | Example 19 |
|---|---|---|---|---|---|---|---|---|---|---|---|---|---|
| 22 h @23° C. 25% Deflection. (%). | 5 | 6 | 6 | 7 | 9 | 7 | 7 | 5 | 4 | 6 | 4 | 9 | 8 |
| 22 h @70° C. 25% Deflection (%). | 26 | 27 | 25 | 26 | 22 | 15 | 21 | 21 | 22 | 20 | 25 | 23 | 25 |
| 22 h @100° C. 25% Deflection (%). | 53 | 68 | 62 | 60 | 51 | 39 | 49 | 49 | 59 | 44 | 64 | 57 | 60 |
| Fatigue to Failure: number of cycles to failure at 140% Stretch | | | | | | | | | | | | | |
| Average | 57308 | 3711 | 21491 | 5010 | 1697 | 7556 | 8356 | 11001 | 37673 | 3838 | 56735 | 82890 | 37989 |
| Std. Dev. | 39004 | 1458 | 7677 | 1648 | 933 | 6555 | 3372 | 2125 | 16538 | 2644 | 22280 | 74655 | 14046 |
| Minimum | 20690 | 2112 | 13844 | 3498 | 881 | 3003 | 4596 | 8727 | 30155 | 1514 | 41842 | 19197 | 19966 |
| Maximum | 106993 | 5538 | 34377 | 7344 | 2936 | 17265 | 12663 | 13577 | 57941 | 6941 | 89733 | 189860 | 56507 |

The above examples are provided as exemplification of the present invention, and are not intended to in any way limit the present invention, which is best defined by the appended claims.

We claim:

1. A multimodal polymer composition comprising:
   a) 45 to 75 wt % of a first polymer fraction comprising ethylene, a $C_3$-$C_{10}$ alpha-olefin, and a non-conjugated diene, wherein the first polymer fraction has been polymerized in a first reactor of a series of two or more reactors, using a Ziegler-Natta catalyst system, wherein the first polymer fraction has a Mooney viscosity of greater than or equal to about 200 ML(1+4@125° C.);
   b) 25 to 55 wt % of a second polymer fraction comprising ethylene, a $C_3$-$C_{10}$ alpha-olefin, and a non-conjugated diene, wherein the second polymer fraction has been polymerized in the presence of the first polymer fraction, in one or more subsequent reactors of the series of two or more reactors, using a Ziegler-Natta catalyst system, wherein the second polymer fraction has a Mooney viscosity of from about 40 ML(1+4@125° C.) to about 100 ML(1+4@125° C.); and
   c) from about 10 phr to about 50 phr of an extender oil which is a liquid at 25° C.,
   wherein the multimodal polymer composition has a number average molecular weight of from about 60,000 to about 350,000 g/mol, and a Mooney viscosity of less than 90 ML(1+4@125° C.); and
   wherein the diene in each fraction is independently selected from the group consisting of 5-ethylidene-2-norbornene (ENB), dicyclopentadiene (DCPD), norbornadiene, 5-vinyl-2-norbornene (VNB), divinylbenzene (DVB), and combinations thereof.

2. The multimodal polymer composition of claim 1, wherein the first polymer fraction has a Mooney viscosity greater than or equal to about 250 ML(1+4@125° C.).

3. The multimodal polymer composition of claim 1, wherein the second polymer fraction has a Mooney viscosity from about 60 to about 90 ML(1+4@125° C.).

4. The multimodal polymer composition of claim 1, having a Mooney viscosity of less than or equal to about 60 ML(1+4@125° C.).

5. The multimodal polymer composition of claim 4, having a Mooney viscosity of less than or equal to about 40 ML(1+4@125° C.).

6. The multimodal polymer composition of claim 1, wherein the $C_3$-$C_{10}$ alpha-olefin of the first polymer fraction and the $C_3$-$C_{10}$ alpha-olefin of the second polymer fraction are propylene, butene, or a combination thereof.

7. The multimodal polymer composition of claim 6, wherein the $C_3$-$C_{10}$ alpha-olefin of the first polymer fraction and the $C_3$-$C_{10}$ alpha-olefin of the second polymer fraction are propylene.

8. The multimodal polymer composition of claim 1, wherein the weight percent of ethylene in the first polymer fraction differs from the weight percent of ethylene in the second polymer fraction by less than or equal to 20 wt %.

9. The multimodal polymer composition of claim 1, wherein the weight percent of diene in the first polymer fraction differs from the weight percent of diene in the second polymer fraction by less than or equal to 8 wt %.

10. The multimodal polymer composition of claim 1, further comprising carbon black and a curative system and optionally, an oil, a fatty acid, a wax, an antioxidant, calcium carbonate, clay, silica, an antiozonant, a tackifier, a scorch inhibiting agent, a plasticizer, or a combination thereof.

11. The multimodal polymer composition of claim 1, further comprising a curative, wherein the cured composition has a Shore A hardness from about 50 to about 60, and a minimum fatigue to failure value of greater than or equal to about 10,000 cycles, determined as cycles to failure at 140% stretch.

* * * * *